(12) United States Patent
Yamaguchi

(10) Patent No.: US 7,760,385 B2
(45) Date of Patent: Jul. 20, 2010

(54) PRINTING SYSTEM

(75) Inventor: Tatsumi Yamaguchi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 11/459,208

(22) Filed: Jul. 21, 2006

(65) Prior Publication Data

US 2007/0019234 A1    Jan. 25, 2007

(30) Foreign Application Priority Data

Jul. 22, 2005    (JP)    ............................. 2005-212736

(51) Int. Cl.
     *G06F 3/12*    (2006.01)
     *G06F 9/46*    (2006.01)

(52) U.S. Cl. .................. 358/1.15; 358/1.13; 358/1.16; 358/1.9; 358/1.2; 358/1.14; 718/104

(58) Field of Classification Search ............... 709/226, 709/238–242; 718/104
See application file for complete search history.

(56) References Cited

U.S. PATENT DOCUMENTS

| | | | | |
|---|---|---|---|---|
| 5,129,639 | A | * | 7/1992 | DeHority .................. 270/1.01 |
| 5,630,062 | A | * | 5/1997 | Okutsu ...................... 718/100 |
| 5,768,516 | A | * | 6/1998 | Sugishima ................. 709/217 |
| 6,141,111 | A | * | 10/2000 | Kato ........................... 358/1.15 |
| 6,301,014 | B1 | * | 10/2001 | Miura et al. ............... 358/1.15 |
| 6,430,311 | B1 | * | 8/2002 | Kumada .................... 382/162 |
| 6,552,813 | B2 | * | 4/2003 | Yacoub ...................... 358/1.1 |
| 6,553,431 | B1 | * | 4/2003 | Yamamoto et al. ............ 710/8 |
| 6,559,959 | B2 | * | 5/2003 | Miura et al. ............... 358/1.13 |
| 6,734,988 | B2 | * | 5/2004 | Murata ...................... 358/1.9 |
| 6,970,261 | B1 | * | 11/2005 | Robles ...................... 358/1.15 |
| 7,014,374 | B2 | * | 3/2006 | Hamaguchi et al. ........... 400/62 |
| 7,127,451 | B1 | * | 10/2006 | Kimura ........................ 707/3 |
| 7,180,626 | B1 | * | 2/2007 | Gassho et al. ................ 358/1.6 |
| 7,532,347 | B2 | * | 5/2009 | Barry et al. ................ 358/1.15 |
| 2001/0029521 | A1 | * | 10/2001 | Matsuda et al. ............ 709/201 |
| 2003/0222985 | A1 | * | 12/2003 | Goto et al. ............... 348/207.2 |
| 2004/0021903 | A1 | * | 2/2004 | Wanda ...................... 358/1.15 |
| 2004/0041865 | A1 | * | 3/2004 | Yano et al. .................... 347/14 |
| 2005/0190383 | A1 | * | 9/2005 | Levin et al. ................. 358/1.1 |
| 2006/0109507 | A1 | * | 5/2006 | Murata ..................... 358/1.15 |

FOREIGN PATENT DOCUMENTS

JP      2001-67193 A    3/2001

\* cited by examiner

*Primary Examiner*—Twyler L Haskins
*Assistant Examiner*—Dennis Dicker
(74) *Attorney, Agent, or Firm*—Panitch Schwarze Belisario & Nadel LLP

(57) ABSTRACT

A printing system is provided capable of executing printing with a suitable printer in accordance with the printing quality assigned by the printing information that becomes the printing objective. The proxy printing judgment unit of the printer judges whether a printer exists that shows a resolution value equal to or higher than that of the resolution assigned by the printing quality information and, in a case where such a printer does not exist in the printer list, executes the process to execute the error message display. In a case where such a printer exists in the printer list, the printer showing the highest resolution value is selected. The process is then executed for demanding creation of proxy printer data from the proxy printer data conversion unit, the created proxy printing file is sent via the network to the proxy printer, and the proxy printer executes the process to perform proxy printing.

4 Claims, 25 Drawing Sheets

FIG. 5
| f | i | l | e | 0 | 0 | 1 | . | b | m | p | | 4 | 3 | 2 | k |
| 0 | 5 | / | 0 | 3 | / | 1 | 5 | | 1 | 9 | : | 2 | 0 | | * |
FIG. 6
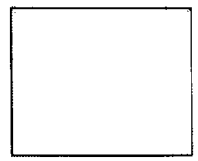
file001.bmp   432kbyte
2005/03/15  19:20
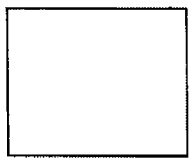
file002.bmp   133kbyte
2005/03/16  9:50
file003.bmp   562kbyte
2005/03/16  11:10
file004.bmp   775kbyte
2005/03/16  15:11
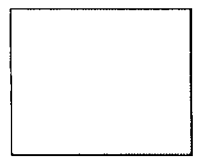
file005.bmp   322kbyte
2005/04/08  18:35
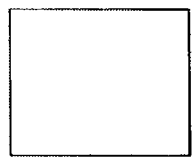
file006.bmp   112kbyte
2005/05/21  12:12

FIG. 14

| No. | IP ADDRESS | PRINTER NAME | RESOLUTION |
|---|---|---|---|
| 1 | 10.10.0.5 | ADG9000 | 2400 |
| 2 | | | |
| 3 | | | |
| 4 | | | |
| 5 | | | |
| 6 | | | |
| 7 | | | |

FIG. 18

| No. | IP ADDRESS | PRINTER NAME | RESOLUTION | PRINTING PAPER |
|---|---|---|---|---|
| 1 | 10.10.0.5 | ADG9000 | 2400 | 2 |
| 2 | | | | |
| 3 | | | | |
| 4 | | | | |
| 5 | | | | |
| 6 | | | | |
| 7 | | | | |

FIG. 19

| RESOLUTION | QUALITY POINTS | PRINTING PAPER | QUALITY POINTS |
|---|---|---|---|
| 600 | 1 | RECYCLED PAPER | 0 |
| 1200 | 2 | STANDARD PAPER | 1 |
| 1440 | 2.4 | GLOSSY PAPER | 2 |
| 2400 | 4 | | |
| 4800 | 8 | | |

FIG. 25

| No. | IP ADDRESS | PRINTER NAME | RESOLUTION | PRINTING PAPER | TEST PRINTING TIME |
|---|---|---|---|---|---|
| 1 | 10.10.0.5 | ADG9000 | 2400 | 2 | 47.62 |
| 2 | | | | | |
| 3 | | | | | |
| 4 | | | | | |
| 5 | | | | | |
| 6 | | | | | |
| 7 | | | | | |

PRINTING SYSTEM

BACKGROUND OF THE INVENTION

The present invention relates to a printing system having multiple printers connected to a data transmission channel capable of sending and receiving information.

Conventionally, through the type of printing system mentioned above, printing is performed by transmitting printing information to any designated printer from a computer connected to a data transmission channel (e.g., networks such as a Local Area Network). There is a technology so-called "proxy printing" (see generally, Japanese Application Publication JA2001-67193 (pages 3-7, FIG. 2)) in which in situations where the designated printer is unable to print due to some problems, e.g., insufficient paper and insufficient toner, printing is executed by a different printer connected to the same data transmission channel.

In the aforementioned proxy printing, after the printer designated by the computer receives the printing information once and determines that printing is impossible, said printer inquires of other printers connected to the data transmission channel whether printing is possible, sends the received printing information to a printer responding that printing is possible, and executes the printing.

Where printing quality, e.g., a difference in image quality or resolution, is different between the designated printer and the proxy printing printer, however, the intended printing quality may not be attained. In order to attain the intended printing quality in such cases, the printer must check whether printing is possible before designating the printer, which is inconvenient.

The present invention takes these types of problems into consideration, it is an objective of the invention to provide a printing system capable of printing with a suitable printer appropriate to the printing quality designated in response to the printing data that becomes the printing target.

BRIEF SUMMARY OF THE INVENTION

In order to achieve the aforementioned goal, the present invention has, in the printing system having multiple printers that execute printing based on input printing information and are connected to a data transmission channel in a condition such that transmission with respect to one another is possible, a judgment mechanism for judging the presence or lack of assignment quality information corresponding to the aforementioned printing information, a selection mechanism for selecting a printer, from amongst the multiple printers, capable of printing the aforementioned printing information with quality assigned by the aforementioned assignment quality information at a time where it is judged by the judgment mechanism that assignment quality information corresponding to the aforementioned printing information is present, a conversion mechanism for converting the aforementioned printing information into a format that the printer selected by the aforementioned selection mechanism can interpret.

In this type of invention, when it is judged by the judgment mechanism that assignment quality information corresponding to the printing information is present, the selection mechanism selects a printer, from the multiple printers, capable of printing the printing information with the quality assigned by the assignment quality information and, only in a case where printing quality has been assigned, a suitable printer can efficiently execute printing according to the assigned printing quality because the printing information was converted into a data format that the printer selected by the selection mechanism can interpret.

Also, another printing system of the present invention has multiple printers that execute printing based on input printing information and are connected to a data transmission channel in a condition such that transmission with respect to one another is possible and executes printing with at least one printer from amongst the multiple printers based on printing information stored in a storage medium connected in a detachable manner and also has a selection mechanism for selecting printing information that becomes an objective based on printing information stored in the aforementioned storage medium, an assignment mechanism for assigning printing quality corresponding to printing information selected by the aforementioned selection unit, a detection mechanism for detecting a printer capable of executing printing with printing quality assigned by the aforementioned assignment unit, and a conversion mechanism for converting the data format of printing information selected by the aforementioned selection unit into a data format that a printer detected by the aforementioned detection unit can print.

In this type of invention, the detection mechanism detects a printer capable of executing printing with the assigned printing quality corresponding to the printing information that was made the printing objective by the assignment mechanism and, because the printing information is converted into a data format that can be printed by the detected printer, a suitable printer can execute printing according to the assigned printing quality.

In the aforementioned printing system, the printer to which the aforementioned storage medium is connected has a judgment mechanism for judging whether printing can be executed with the printing quality assigned by the aforementioned assignment mechanism. In a case where it is judged by the judgment mechanism that the printer to which the aforementioned storage medium is connected cannot execute printing, it is acceptable for the aforementioned detection mechanism to detect another printer capable of executing printing with the assigned printing quality.

In this type of invention, the judgment mechanism first judges whether the printer to which the storage medium is connected can execute printing with the printing quality assigned by the assignment mechanism. In a case where it is judged by the judgment mechanism that the printer to which the aforementioned storage medium is connected cannot execute printing, because another printer capable of executing printing with the assigned printing quality is detected, a suitable printer can efficiently execute printing. Even in a case where the printer to which the aforementioned medium is connected can execute printing, the detection mechanism omits the gratuitous process of detecting another printer and therefore a suitable printer can efficiently execute printing.

Also, in the aforementioned printing system, it is acceptable for the aforementioned assignment mechanism to assign the type of printing medium used in printing based on the printing information selected by the aforementioned selection mechanism. Through this type of invention, the user assigns the type of printing medium as the printing quality information by the assignment mechanism and a suitable printer can execute printing.

In the aforementioned printing system, it is acceptable for the aforementioned conversion mechanism to convert the aforementioned printing information after acquiring the conversion program for converting the data format form the printer detected by the detection mechanism. Through this type of construction, the conversion mechanism can, using the conversion program, convert the printing information into a data format that allows the appropriate printer to perform printing because the conversion program for converting the data format was previously acquired from the printer detected by the detection mechanism.

In the aforementioned printing system, the aforementioned storage medium stores the printing quality information corresponding to the printing information and it is acceptable for the aforementioned assignment mechanism to assign the printing quality based on the aforementioned printing quality information corresponding to the selected aforementioned printing information.

Through this type of construction, the storage medium previously stores the printing quality information corresponding to the printing information and, because the assignment mechanism assigns the printing information based on the printing quality information corresponding to the selected printing information, printing can be executed corresponding to the printing quality information previously stored in the storage medium by the user.

Also, the printing system of the present invention has multiple printers that execute printing based on input printing information and are connected to a data transmission channel in a condition such that transmission with respect to one another is possible and executes printing with at least one printer from amongst the multiple printers based on printing information stored in a storage medium connected in a detachable manner and also has a test printing information transmission mechanism for sending test printing information for executing test printing by each of the aforementioned multiple printers, a test printing time measurement mechanism for measuring the time information from when the aforementioned test printing information transmission mechanism sends test printing information to when information of the completed status of test printing sent from each printer is received, a selection mechanism for selecting printing information that becomes the printing objective from printing information stored in the aforementioned storage medium, an assignment mechanism for assigning printing quality for printing information selected by the aforementioned selection mechanism, a detection mechanism for detecting a printer capable of executing printing with the printing quality assigned by the aforementioned assignment mechanism, a time selection mechanism for selecting a printer for executing printing based on the time information measured by the aforementioned test printing time measurement mechanism in a case where the aforementioned detection mechanism detected multiple printers, and a conversion mechanism for converting the data format of the printing information selected by the aforementioned selection mechanism into a data format by which a printer detected by the aforementioned time selection mechanism can perform printing.

In this kind of invention, the test printing time measurement mechanism measures the time information from when the test printing information transmission unit sends the test printing information to when the information of the test printing completion sent from each printer is received. In a case where the detection mechanism detects multiple printers, because the time selection mechanism selects a printer to execute printing based on the time information measured by the test printing time measurement mechanism, printing is executed by, for example, the printer with the shortest time until the information of the test printing completion based on the time information is received and printing can therefore be efficiently performed by a suitable printer.

In the above manner, the printing system of the present invention is capable of printing with a suitable printer appropriate to the printing quality designated in response to the printing data that becomes the printing target.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 5 is an explanatory diagram showing the appearance of the file information displayed in the operator panel 208 of the printing system of the present invention.

FIG. 6 is an explanatory diagram showing the appearance of thumbnail printing of the printing system of the present invention.

FIG. 14 is an explanatory diagram showing the proxy printer list of the printer 2 of the present invention.

FIG. 18 is an explanatory diagram showing the proxy printer list of the printer 2a of the second embodiment.

FIG. 19 is an explanatory diagram showing the printing quality calculation table of the second embodiment.

FIG. 25 is an explanatory diagram showing the proxy printer list of the printer 2b of the third embodiment.

DETAILED DESCRIPTION OF THE INVENTION

First Embodiment

Figure 1:
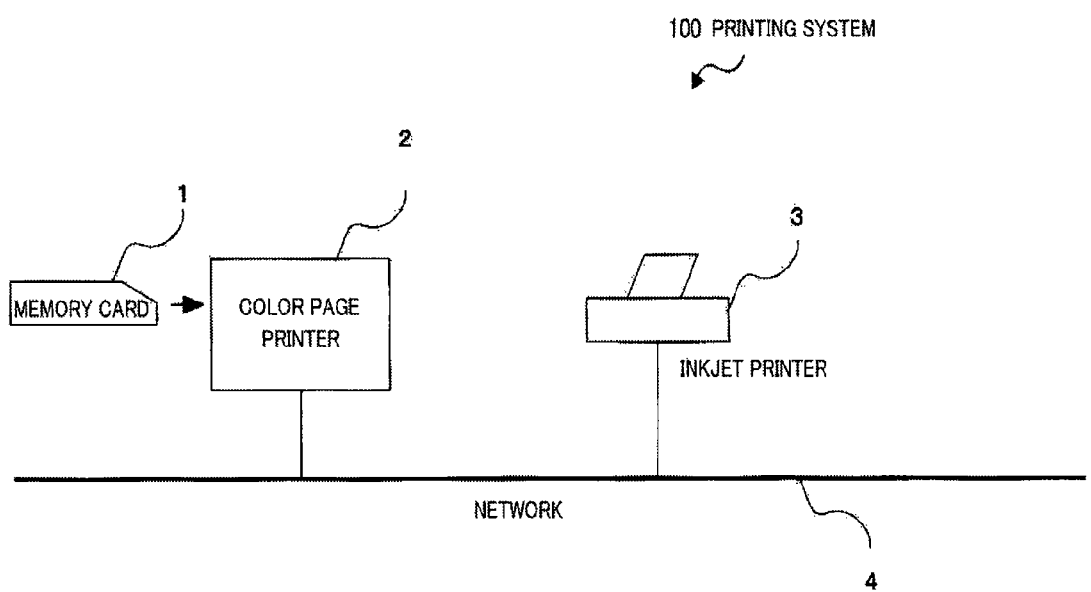
FIG. 1 is an explanatory diagram showing the overall construction of the printing system of the present invention.

The following is a detailed explanation including diagrams of the best mode for carrying out the first embodiment of the present invention. FIG. 1 is an explanatory diagram showing the overall construction of the printing system 100 of the present invention. The printing system 100 of the present invention is composed of a memory card 1 that is a memory medium in which printing information such as images and sentences are stored, a printer 2 that executes printing based on printing information and is connected in such a manner as to allow information to be read from, for example, memory card 1 that is inserted in a port suitable for the product configuration of memory card 1, a printer 3 that is of a different type than printer 2 and a network 4 connecting printer 2 and printer 3 to each other in a manner allowing transmission.

The memory card 1 is able to store a file containing printing information such as images and sentences in a prescribed data format and, where the memory card 1 is inserted into a port not shown graphically, an output terminal formed in a part of the product configuration comes into contact with an input terminal formed in the port and the printing data stored in the memory card 1 becomes readable by the printer 2.

The printer 2 is, for example, a printer such as an electrophotographic color printer capable of reading the printing data from the memory card 1 and executing the printing and the maximum value for the printed image resolution is 600 dpi (dots per inch).

Figure 2:
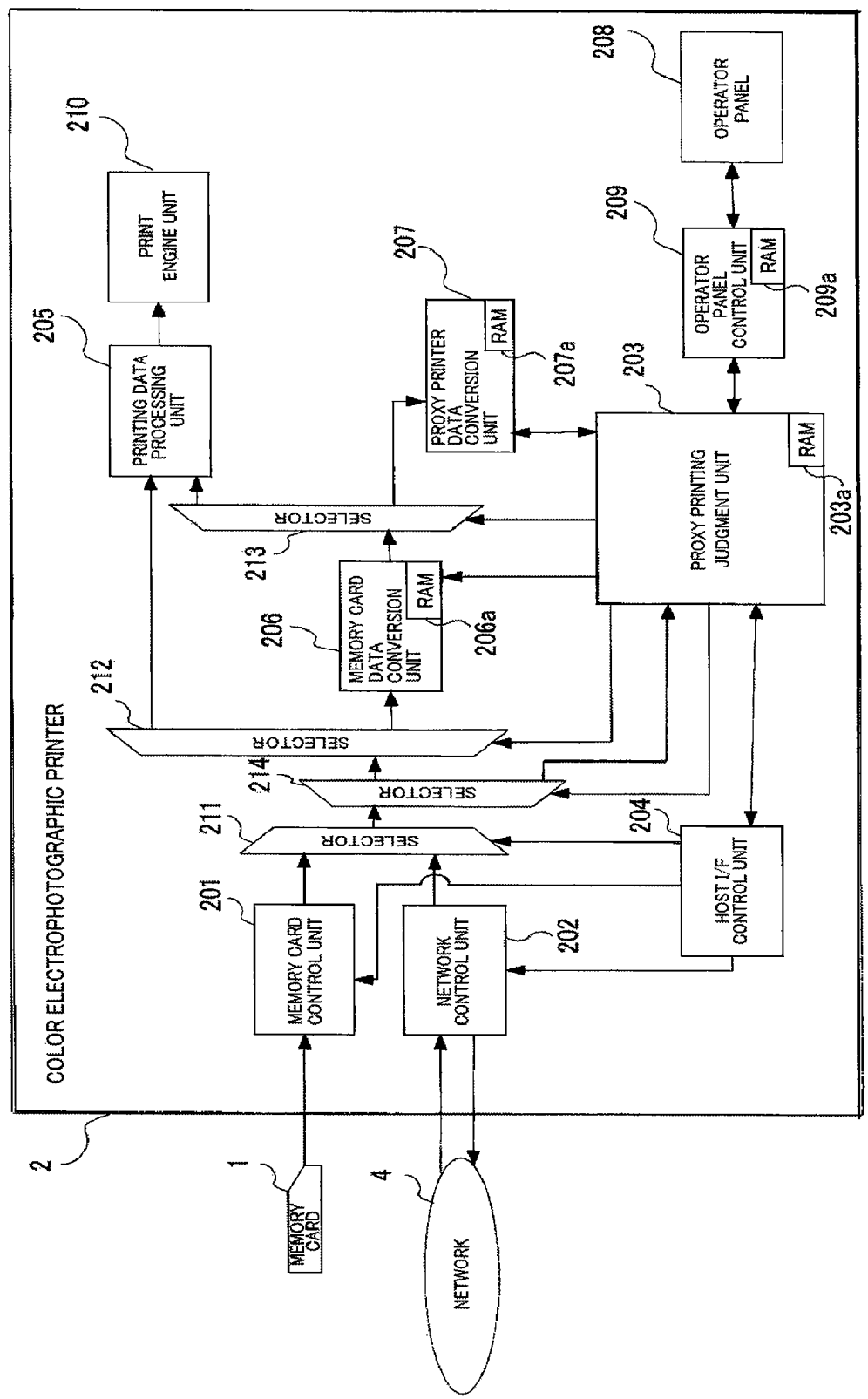
FIG. 2 is an explanatory diagram showing the construction of the printer 2 of the printing system of the present invention.

FIG. 2 is an explanatory diagram showing the construction of the printer 2 as shown in FIG. 2, the printer 2 includes a memory card control unit 201, a network control unit 202, a proxy printing judgment unit 203, a host I/F control unit 204, a printing data processing unit 205, a memory card data conversion unit 206, a proxy printer data conversion unit 207, an operator panel 208, an operator panel control unit 209, a print engine unit 210, and selectors 211, 212, 213, and 214.

The memory card control unit 201 judges whether the memory card 1 is connected to the port that is not shown graphically and, in a situation where it is connected, has a function to execute reading and the like of the printing information from the memory card 1.

The network control unit 202 is connected to the network 4 and has a function to send and receive information and conduct communications with external equipment via the network 4. When information is received via the network 4 it is sent to the selector 211 and there is a function to send the data received from the host I/F unit 204 to external equipment via the network 4.

The proxy printing judgment unit 203 has a function to judge whether proxy printing will be executed by the printer 3 based on information stored in the RAM housed in the operator panel control unit 209. Also, in a case where the proxy printing is executed due to the judgment result, the proxy printer data conversion unit 207 has a function to send the information for sending the converted printing information to the printer 3 to the host I/F control unit 204 through the function described hereinafter. The proxy printing judgment unit 203 has a function to control the selectors 212, 213, and 214 and process the information. Also, the proxy printing judgment unit 203 houses the RAM 203a that stores the printing data.

The host I/F control unit 204 has a function to send information to external equipment via the network 4 using the network control unit 202. The host I/F control unit 204 has a function to control the selector 211 and process the information. Also, the host I/F control unit 204 has a function to send the information sent from the proxy printing judgment unit 203 to the printer 3 via the network 4 using the network control unit 202.

The printing data processing unit 205 receives printing information sent from the selector 212 or the memory card data conversion unit 206 and, in response to this printing information, executes the data processing that makes it possible for print engine unit 210 to perform the printing. For example, as data processing, the printing data processing unit 205 executes a color conversion process according to the colors from the output characteristics of print engine unit 210 in response to the printing information, separates the images and such included in the printing information by color, executes a binarization process, creates raster data, and sends it to the print engine unit 210.

The memory card data conversion unit 206 receives the printing information of the memory card 1 sent from the memory card control unit 201 via the selectors 211, 213, and 214 and, in response to this printing information, executes the data processing that makes it possible for the printing to be performed by print engine. For example, the memory card data conversion unit 201, as this data processing, executes shrinking and expanding of the images included in the received printing information and an arrangement process in accordance with the designated contents of the printing information stored in the RAM that is housed in the operator panel control unit 209. Also, the memory card data conversion unit 206 houses the RAM 206a.

The proxy printer data conversion unit 207 has a function to convert the data format of the printing information sent from the memory card data conversion unit 206 via the selector 213 into a data format that makes it possible for the printer 3 to perform the proxy printing. Also, the proxy printer data conversion unit 207 houses the RAM 207a that stores the conversion program that includes a conversion table for performing the conversion of this data format. The data format of the printing information based on the conversion program is converted into a data format that allows the printer 3 to perform proxy printing and the converted data format of the printing information is sent to the proxy printing judgment unit 203.

The operator panel 208 is a display screen such as a liquid crystal display panel formed in a portion of the surface of the printer 2 and has a function to display and acquire the menu display data of various types of commands and such described later and stored in the RAM 209a that is housed in the operator panel control unit 209.

Further, the operator panel 208 is established with multiple buttons in the vicinity of the display screen relevant to the operation mechanism and has a function to store in the RAM 209a housed in the operator panel control unit 209, setting information of various types of commands and such corresponding to assignment operations or selection operations by these buttons being pressed by the user.

Figure 3:
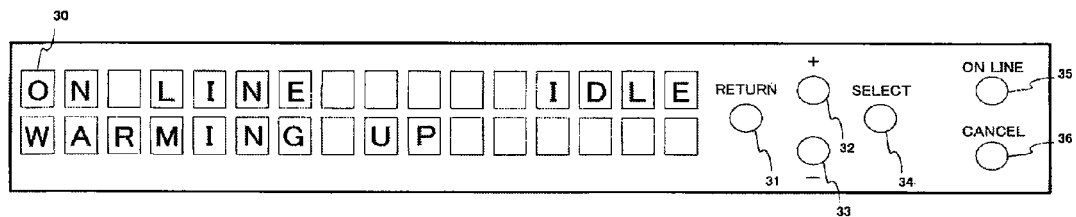
FIG. 3 is an explanatory diagram showing the construction of the display unit 30 of the printer 2 of the printing system of the present invention.

Selection information that selected printing information, which is the printing objective from the printing information stored in the memory card 1, and printing quality information designated according to the printing information selected by the selection information are given as this setting information. FIG. 3 is an explanatory diagram showing the construction of the operator panel 208. As shown in FIG. 3, the operator panel 208 has a display unit 30 for displaying characters, symbols, and the like and multiple buttons 31, 32, 33, 34, 35, and 36.

The display unit 30 is structured with a prescribed number of displays squares arranged in a line that are an arrangement of multiple picture cells displaying one letter, symbol, and the like each and only sentences or words up to the number of display squares are able to be displayed.

Button 31 is a button for returning once again to the previous menu display and having it displayed in display unit 30 after the menu display that is displayed on the display unit 30 has been switched by selection operations such as those discussed later.

Button 32 and button 33 are buttons for changing or adjusting, through increasing or decreasing, the setting values that were set for the printing information through the various types of commands displayed in the display unit 30. Also, button 32 and button 33 are buttons for changing the selection items that are selected as the setting contents through various types of commands.

Button 34 is a button for performing, through the various types of commands shown in the display unit 30, the selection operation with the setting values and selection items after the setting values and selection items have been changed or adjusted.

Button 35 is a button for, when pressed by the user, switching the condition of the printer 2 between that of being able to send and receive printing information and that of not being able to send and receive printing information, via the network 4.

Button 36 is a button for, when pressed by the user, erasing the printing information display without performing printing in response to the printing information displayed in the display unit 30. In addition, FIG. 5 is an example of a file with data named "file001" displayed in the display unit 30. Through the various types of commands pertaining to the printing information contained in this file, the button 34 for performing the printing of the printing objective is pressed, the selection operation is performed, and the assignment operation is performed for the printing quality information.

The operator panel control unit 209 houses the RAM 209a and has a function to store, in the RAM 209a, the menu display data that the operator panel 208 displays and to send and display this menu display data in the operator panel 208.

Also, through the operator panel 208 in cases where the button is pressed and the selection operation or assignment operation is performed, selection information or printing quality information corresponding to the selection operation or assignment operation is stored in the RAM 209a.

The print engine unit 210 has various types of motor control units driving mechanisms that perform the paper feed for actually printing images and such on paper, a process control unit that transfer toner to the paper and form the images, and a fixation unit for fixing the toner that is transferred to the paper. The print engine unit 210 has a function to execute printing based on the raster data sent from the printing data processing unit 205.

The selector 211 has 2 input terminals and 1 output terminal. The input terminals are connected to the memory card control unit 201 and the network control unit 202 respectively and the output terminal is connected to the selector 214. The selector 211 has a function to output, from the output terminal, the printing information input from the input terminals in accordance with the selection signal sent from the host I/F control unit 204.

The selector 212 has 1 input terminal and 2 output terminals. The input terminal is connected to the selector 214 and the output terminals are connected to the printing data processing unit 205 and the memory card data conversion unit 206 respectively. The selector 212 has a function to output, from either of the output terminals, the printing information input from the input terminal in accordance with the selection signal sent from the proxy printing judgment unit 203.

The selector 213 has 1 input terminal and 2 output terminals. The input terminal is connected to the memory card data conversion unit 206 and the output terminals are connected to the printing data processing unit 205 and the proxy printer data conversion unit 207. The selector 213 has a function to output, from either of the output terminals, the printing information input from the input terminal in accordance with the selection signal sent from the proxy printing judgment unit 203.

The selector 214 has 1 input terminal and 2 output terminals. The input terminal is connected to the selector 211 and the output units are connected to the selector 212 and the proxy printing judgment unit 203 respectively. The selector 214 has a function to output, from either of the output terminals, the printing information input from the input terminal in accordance with the selection signal sent from the proxy printing judgment unit 203.

The printer 3 is, for example, a printer such as an Inkjet printer that is incapable of reading the printing information from the memory card 1 and executing the printing but is capable of printing with a higher resolution value than the printer 2. The maximum value for the image resolution is, for example, 2400 dpi.

Concerning the performance of the printing system of the first embodiment, a detailed explanation will be given using diagrams. First, the performance of the operator panel 208 will be explained using FIG. 4. When the printer 2 is activated in a condition where the memory card 1 is inserted into the port, not shown in the same diagram, of the printer 2, the operator panel control unit 209 reads the menu display data from the RAM 209a corresponding to the memory card 1 inserted in the port and sends the menu display data to the operator panel 208. In the operator panel 208, this menu display data is received and, as a storage medium that stores the printing information that is selectable as the printing objective, the words "memory card" are displayed in the primary menu display in the display unit 30 (reference FIG. 4 (a)).

Next, when the user presses the button 34 in this way, the display unit 30 screen switches and next, concerning the printing information stored in the memory card 1, the display unit 30 shows a secondary menu display for choosing one of the following commands: "thumbnail printing" that prints a list of the printing information, "file information display" that shows the file in which the printing information is stored, and "file printing" that prints the images and such included in the printing information. Here, "thumbnail printing" has the purpose of condensing, displaying, and printing in the form of a list the images and such stored in all of the printing information stored in the memory card 1 and choosing from this printed list display, for example, the images and such of specific printing information for printing at a high resolution printing quality.

Figure 4:
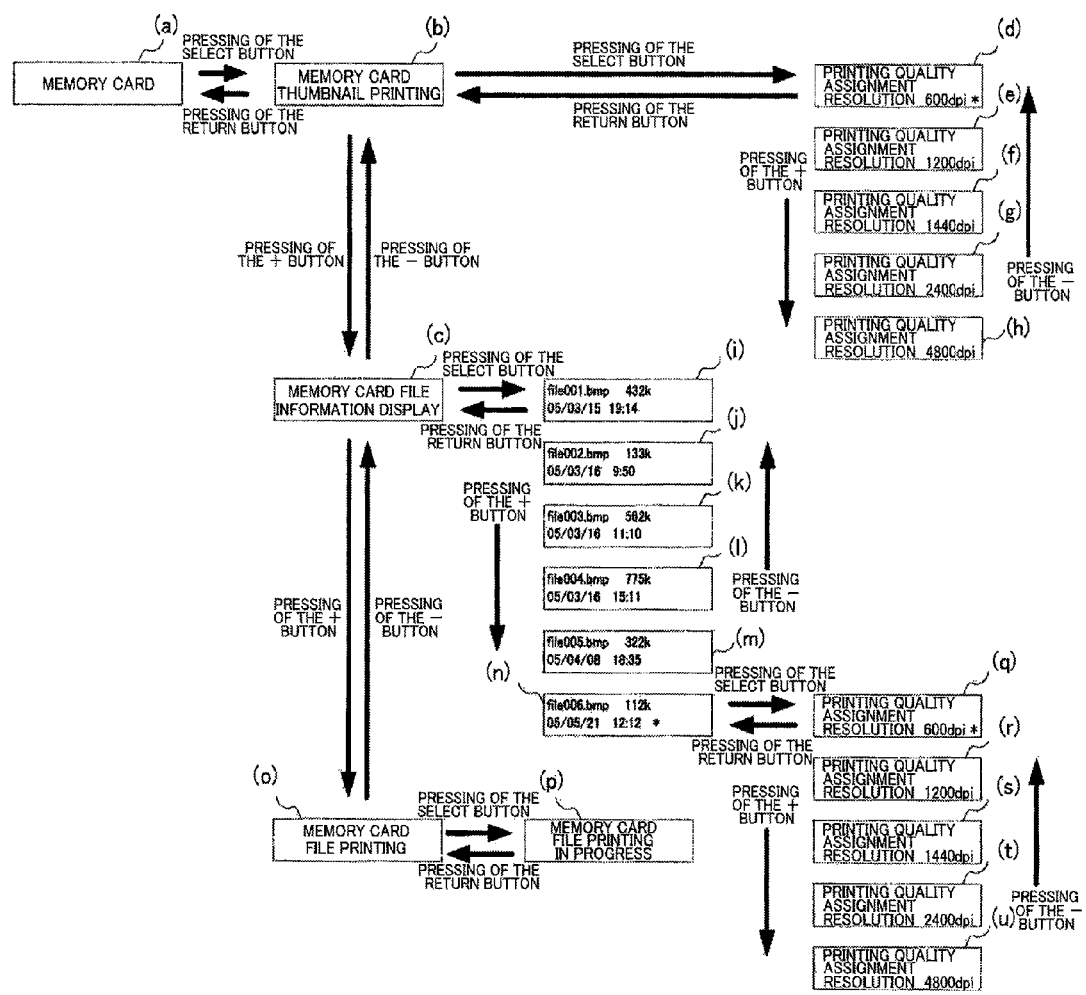
FIG. 4 is an explanatory diagram showing the performance of the operator panel 208 of the printing system of the present invention.

Next, the user presses button 32 and button 33, changing the selection items of the menu display and making "thumbnail printing" displayed in the display unit 30, and when button 34 is pressed (reference FIG. 4 (b)), the display unit 30 screen switches and the display unit 30 shows a tertiary menu display for assigning the printing quality for the thumbnail printing.

Next, the user presses button 32 and button 33 and, from the selection items of "600 dpi resolution" (reference FIG. 4 (d)), "1200 dpi resolution" (reference FIG. 4 (e)), "1440 dpi resolution" (reference FIG. 4 (f)), "2400 dpi resolution" (reference FIG. 4 (g)), and "4800 dpi resolution" (reference FIG. 4 (h)) that can be assigned as the printing quality of the images and such in the tertiary menu display, changes the selection items displayed in the display unit 30 and, when the button 34 is pressed to cause the assignment operation while one of the printing qualities is displayed, the operator panel control unit 209 corresponding to this assignment operation stores this printing quality information that has undergone the assignment operation in the RAM 209a.

Next, the user presses button 32 and button 33 in the aforementioned secondary menu display, changing the selection items of this menu display and, when the button 34 is pressed while "file information display" is displayed in the display unit 30 (reference FIG. 4 (c)), the display unit 30 screen switches and the display unit 30 shows a tertiary menu display for displaying one of the files from the files that stores the printing information.

Next, the user presses button 32 and button 33 and, from the selection items of, for example, "file001" (reference FIG. 4 (i)), "file002" (reference FIG. 4 (j)), "file003" (reference FIG. 4 (k)), "file004" (reference FIG. 4 (l)), "file005" (reference FIG. 4 (m)), and "file006" (reference FIG. 4 (n)) that can be displayed as files in this tertiary menu display, changes the selection items displayed in the display unit 30 and, by displaying the file that the user desires, is able to confirm the contents of this file being displayed.

The user presses button 32 and button 33, changing the selection items in order to select the file that is the printing objective in this tertiary menu display and, when the button 34 is pressed to cause the assignment operation while the contents of one of the files is displayed, the display unit 30 screen switches and the display unit 30 shows a quaternary menu display for assigning the printing quality of the file on which this selection operation was performed. Here, for example, the file "file006" is set as the printing objective by the selection operation.

Next, the user presses button 32 and button 33 and, from the selection items of "600 dpi resolution" (reference FIG. 4 (d)), "1200 dpi resolution" (reference FIG. 4 (e)), "1440 dpi resolution" (reference FIG. 4 (f)), "2400 dpi resolution" (reference FIG. 4 (g)), and "4800 dpi resolution" (reference FIG. 4 (h)) that can be assigned as the printing quality of the file set by the selection operation in the quaternary menu display, changes the selection items displayed in the display unit 30 and, when the button 34 is pressed to cause the assignment operation while one of the printing qualities is displayed, the operator panel control unit 209 corresponding to this assignment operation links this printing quality information that has undergone the assignment operation with the selection information that performed the selection operation on the aforementioned file and stores it in the RAM 209a.

Next, the user presses button 32 and button 33 in the aforementioned secondary menu display, changing the selection items of this menu display and, when the button 34 is pressed while "file printing" is displayed in the display unit 30 (reference FIG. 4 (o)), the display unit 30 screen switches and the letters for "file printing in process" are displayed in the display unit 30 (reference FIG. 4 (p)). The process for printing is then performed, with printing quality corresponding to the printing quality information linked to this selection information, for the printing information that includes the file corresponding to the selection information stored in the RAM 209a of the aforementioned operator panel control unit 209.

Figure 7:
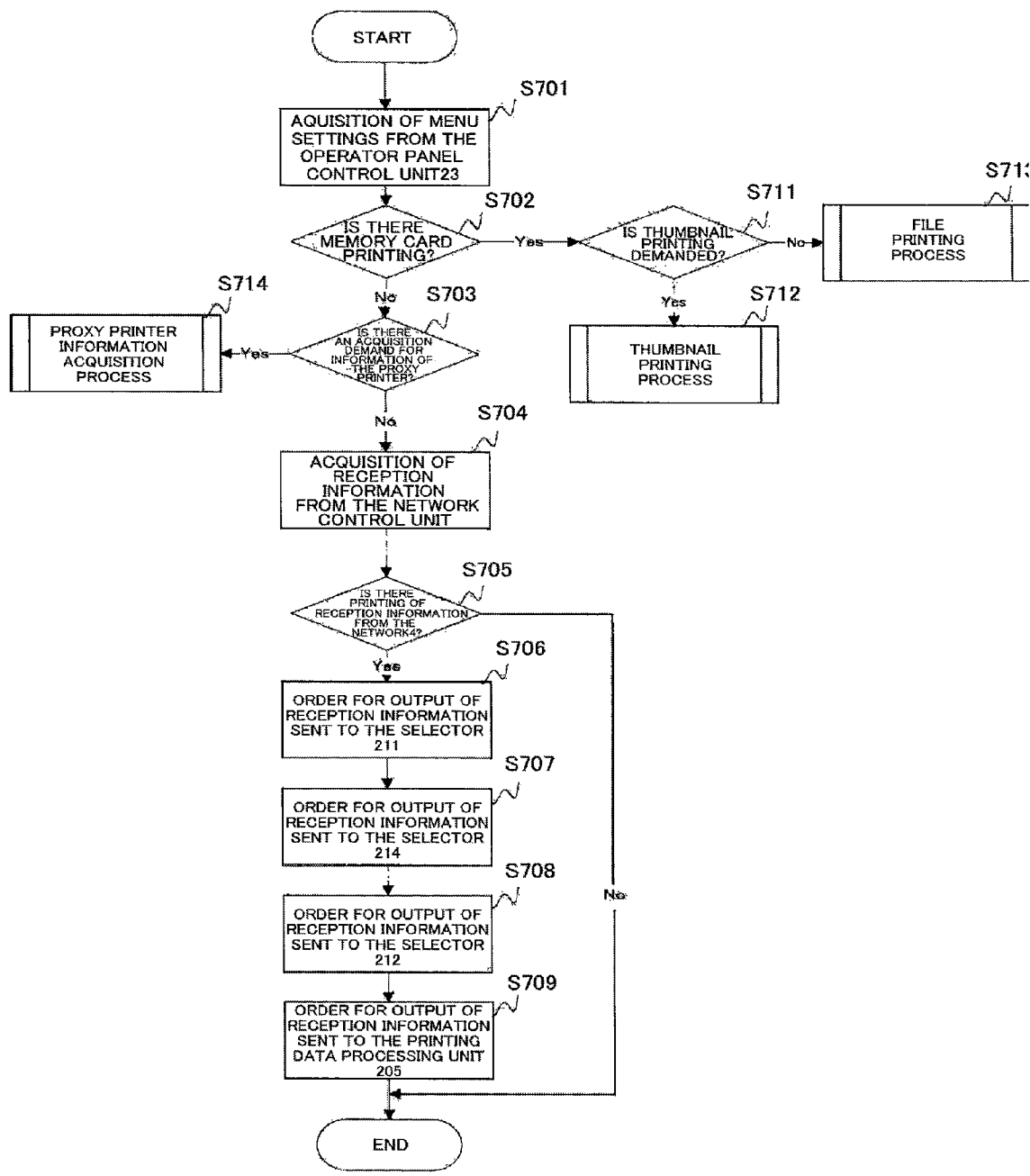
FIG. 7 is a flow chart showing the performance of the proxy printing judgment unit 203 of the printer 2 of the present invention.

Concerning the performance of the proxy printing judgment unit 203, a detailed explanation will be given using the flow chart shown in FIG. 7. The performance of this proxy printing judgment unit 203 is carried out, for example, periodically every few milliseconds. First, when the performance of the proxy printing judgment unit 203 begins, the operator panel control unit is accessed and the printing quality information, selection information, and the like that are stored in the RAM 209a that is housed in the operator panel control unit 209 are read (step S701).

Next, the proxy printing judgment unit 203 judges whether printing of the images and such of the printing information recorded in the memory card 1 is required (step S702). Through the performance of the aforementioned operator panel 208, the proxy printing judgment unit 203, in a case where the user presses the button 34 while "thumbnail printing" or "file printing" are displayed in the secondary menu display, judges that printing has been ordered and in a case where the button 34 is not pressed, judges that printing has not been ordered.

Next, the proxy printing judgment unit 203, in a case where it is judged that printing has been ordered (the "YES" of step S702), judges whether the ordered printing is "thumbnail printing" (step S711). In a case where the button 34 is pressed while "thumbnail printing" is displayed in the secondary menu display, it is judged that the ordered printing is "thumbnail printing" (the "YES" of step S711) and the process to perform "thumbnail printing" is executed (step S712). Also, in a case where the button 34 is pressed while "file printing" is displayed in the secondary menu display, it is judged that the ordered printing is not "thumbnail printing" (the "NO" of step S711) and the process to perform "file printing" is executed (step S713).

Next, the proxy printing judgment unit 203, in a case where it is judged that printing has not been ordered (the "NO" of step S702), judges whether the user requires acquisition of the information relating to the printer 3 specified by the IP address based on, for example, the operation input by the user of the operation mechanism of a keyboard and such not shown graphically for the IP address of the network 4 of the printer 3 (step S703). Here, as the operation mechanism for inputting the IP address, a computer and such connected to the printer 2 in a manner allowing the sending and receiving of information is provided. As the information relating to the printer 3, paper size allowing printing, printing quality allowing assignment for every printing, and range of resolution and such are provided.

Next, the proxy printing judgment unit 203, in a case where acquisition of the information relating to the printer 3 is required, performs the process for acquiring the information from the proxy printer (step S714).

Next, the proxy printing judgment unit 203, in a case where acquisition of the information relating to the printer 3 is not required, performs the process for acquiring the information from the network control unit 202 (step S704). The proxy printing judgment unit 203 sends a control signal to the host I/F control unit 204 and acquires the information from the network control unit 202 via the host I/F control unit 204.

Next, the proxy printing judgment unit 203 judges whether printing is required from external equipment via the network 4 (step S705). The proxy printing judgment unit 203 retrieves the data acquired from the network control unit 202 at step S704 and performs the process to detect, from this information, the printing information and the order information that requires printing of the printing information. In a case where the printing information and the order information that requires printing of the printing information are detected, it is judged that printing from external equipment is required and, in a case where the printing information and the order information that requires printing of the printing information are not detected, it is judged that printing from external equipment is not required.

Next, in a case where it is judged that printing from external equipment is required (the "YES" of step S705), the proxy printing judgment unit 203 executes the process to begin the performing this printing (step S706). The proxy printing judgment unit 203 sends a control signal to the host I/F control unit 204 and executes the process to send the printing information and order information detected by the network control unit 202 at step S705 to the selector 211.

Next, the proxy printing judgment unit 203 sends a control signal to the host I/F control unit 204 and executes the process to send the printing information and order information sent from the network control unit 202 by the selector 211 to the selector 214 (step S707).

Next, the proxy printing judgment unit 203 sends a control signal to the selector 214 and the selector 214 executes the process to send the printing information and order information to the selector 212 (step S708).

Next, the proxy printing judgment unit 203 sends a control signal to the selector 212 and the selector 212 executes the process to send the printing information and order information to the printing data processing unit 205 (step S709). The printing data processing unit 205 executes data processing for the printing information sent from the selector 212 and creates the raster data. The print engine unit 210 executes printing based on this raster data.

Also, at step S705, performance is finished in a case where it is judged that printing from external equipment is not required (the "NO" of step S705).

Figure 8:
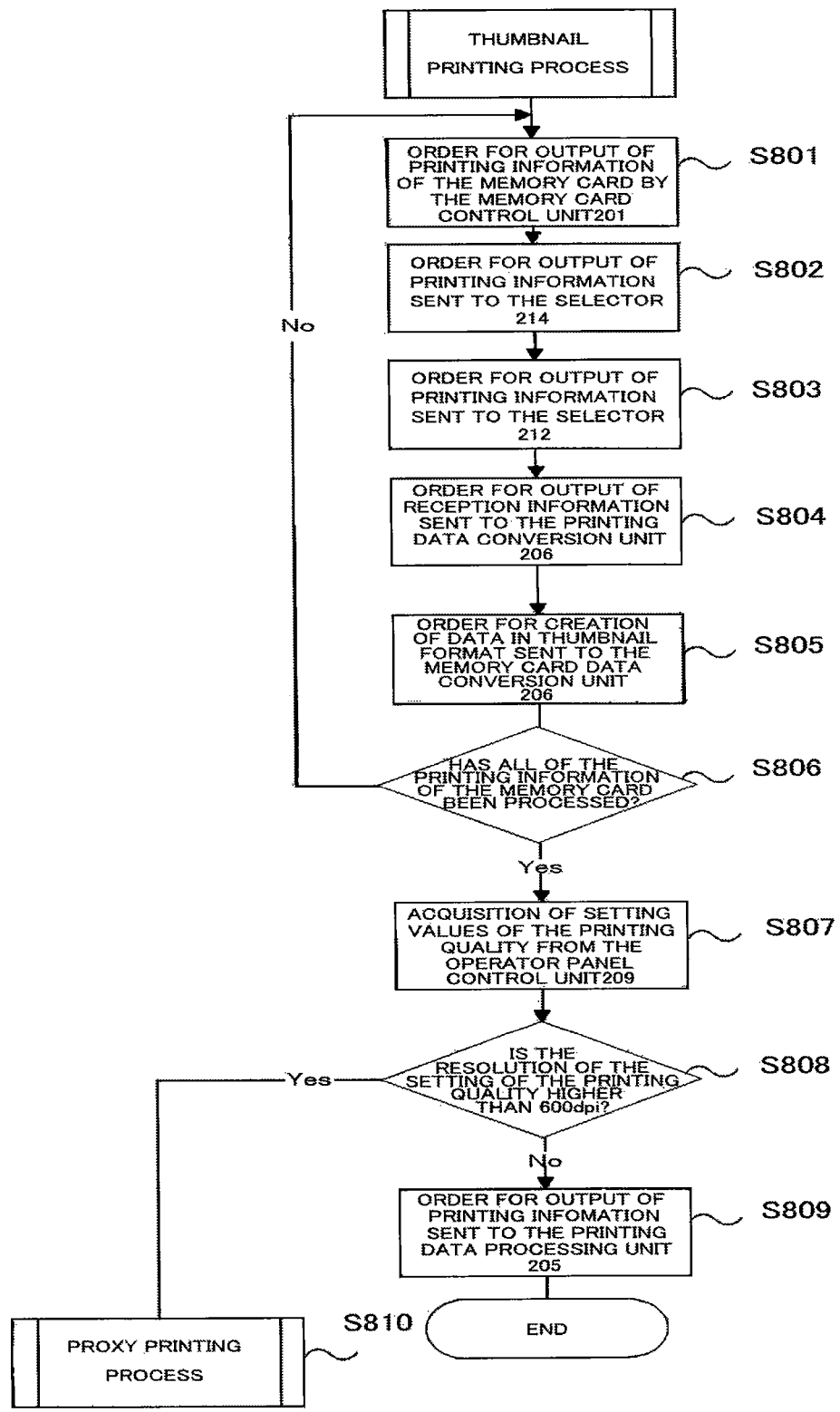
FIG. 8 is a flow chart showing the thumbnail printing process performed by the proxy printing judgment unit 203 of the printer 2 of the present invention.

Concerning the thumbnail printing process performed by the proxy printing judgment unit 203 in the aforementioned step S712, a detailed explanation is given using the flow chart shown in FIG. 8. First, the proxy printing judgment unit 203 sends a control signal to the host I/F control unit 204 and the memory card control unit 201 executes the process to send the printing information that includes all of the files recorded in the memory card 1 to the selector 211 (step S801).

Next, the proxy printing judgment unit 203 sends a control signal to the host I/F control unit 204 and the selector 211 executes the process to send the all of this printing information to the selector 214 (step S802).

Next, the proxy printing judgment unit 203 sends a control signal to the selector 214 and the selector 214 executes the process to send the all of this printing information to the selector 212 (step S803).

Next, the proxy printing judgment unit 203 sends a control signal to the selector 212 and the selector 212 executes the process to send the all of this printing information to the memory card data conversion unit 206 (step S804).

Next, the proxy printing judgment unit 203 sends a control signal to the memory card data conversion unit 206 and the memory card data conversion unit 206 performs the process to execute the creation of printing information that is a all of this printing information sent from the selector 212 edited or such into a thumbnail printing format (step S805). The memory card data conversion unit 206, in accordance with the control signal sent from the proxy printing judgment unit 203, executes a process or the like to shrink and arrange in the prescribed locations all of the images and such included in the printing information and create printing information in a thumbnail printing format for all of this printing information.

Next, the proxy printing judgment unit 203 executes the process to judge whether editing and the like in a thumbnail printing format has been executed for all of the printing information stored in the memory card 1 (step S806). The proxy printing judgment unit 203 judges whether all of the printing information in thumbnail printing format created by the memory card data conversion unit 206 is analogous with all of the printing information stored in the memory card 1. Here, concerning all of the printing information stored in the memory card 1, a control signal is sent to the host I/F control unit 204 and the memory card control unit 201 executes the process to understand this information. In a case where the information is analogous, it is judged that editing and the like into a thumbnail printing format was executed for all of the printing information stored in the memory card 1 and, in a case where the information is not analogous, it is judged that editing and the like into a thumbnail printing format was executed for all of the printing information and a repeat of the processes from step S801 are once again performed.

Next, the proxy printing control unit 203, in a case where it is judged that editing and the like into a thumbnail printing format has been executed for all of the printing information stored in the memory card 1 (the "YES" of step S806), executes the process to acquire the printing quality information assigned for the thumbnail printing (step S807). The proxy printing control unit 203 accesses the RAM 209a housed in the operator panel control unit 209 and executes the process to read the printing quality information on which the assignment operation was performed in the tertiary menu of the menu display concerning the "thumbnail printing" of every performance of the aforementioned operator panel 208. This information is then stored in the RAM 203a.

Next, the proxy printing judgment unit 203 judges whether the resolution assigned to the printing quality information acquired at the step S1127 is of a lower value than the maximum resolution value of the printer 2 and also judges whether it is possible to execute printing at the resolution assigned for the printer 2. The proxy printing judgment unit 203 accesses in advance the RAM 209a of the operator panel control unit 209, reads, for example, the information of 600 dpi as the maximum value of the resolution that can be assigned for printing by the printer 2 and executes the process to compare the information of 600 dpi and the resolution assigned for the printing quality information. In a case where the resolution assigned by this printing quality information is of a higher value than 600 dpi, it is judged that it is not possible to execute printing through the printer 2 with the resolution assigned for the printing quality information. Also, in a case where the resolution assigned by this printing quality information is of a lower value than 600 dpi, it is judged that it is possible to execute printing through the printer 2 with the resolution assigned for the printing quality information.

Next, the proxy printing judgment unit 203, in a case where it is judged that it is not possible to execute printing through the printer 2 with the resolution assigned for the printing quality information (the "YES" of step S808), executes the process to perform the proxy printing (step S810).

Also, in a case where it is judged at step S808 that it is possible to execute printing through the printer 2 with the resolution assigned for the printing quality information (the "NO" of step S808), the proxy printing judgment unit 203 sends a control signal to the selector 213 and the selector 213 acquires the printing information in a thumbnail printing format from the memory card data conversion unit 206 and executes the process to send this information to the printing data processing unit 205 (step S809). The printing data processing unit 205 executes data processing for the printing information sent from the selector 213 and creates the raster data. The print engine unit 210 executes printing based on this raster data as shown in FIG. 6.

Figure 9:
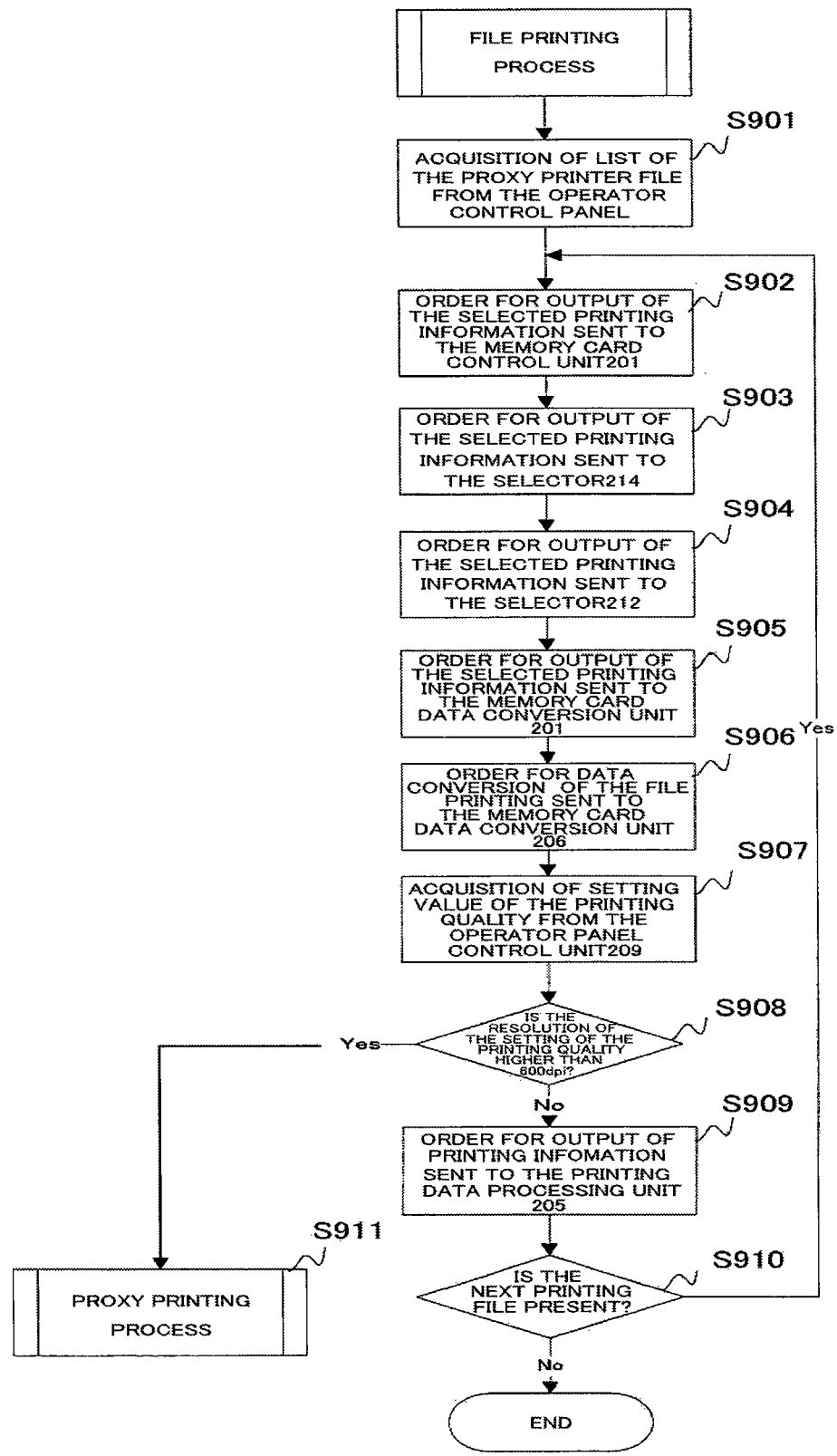
FIG. 9 is a flow chart showing the file printing process performed by the proxy printing judgment unit 203 of the printer 2 of the present invention.

Concerning the file printing process performed by the proxy printing judgment unit 203 at the aforementioned step S713, a detailed explanation will be given using the flow chart shown in FIG. 9. First, the proxy printing judgment unit 203 acquires the list of files that are the printing objective out of each file that includes the printing data stored in the memory card 1 (step S901). The proxy printing judgment unit 203 acquires the selection information stored in the RAM 209a for every performance of the aforementioned operator panel 208 by the operator panel control unit 209.

Next, the proxy printing judgment unit 203 sends a control signal to the host I/F control unit 204 and the memory card control unit 201 reads the printing information included in the file relevant to this selection information form the memory card 1 and further executes the process to send this information to the selector 211 (step S902).

Next, the proxy printing judgment unit 203 sends a control signal to the host I/F control unit 204 and the selector 211 executes the process to send this printing information to the selector 214 (step S903).

Next, the proxy printing judgment unit 203 sends a control signal to the selector 214 and the selector 214 executes the process to send this printing information to the selector 212 (step S904).

Next, the proxy printing judgment unit 203 sends a control signal to the selector 212 and the selector 212 executes the process to send this printing information to the memory card data conversion unit 206 (step S905).

Next, the proxy printing judgment unit 203 sends a control signal to the memory card data conversion unit 206 and the memory card data conversion unit 206 performs the process to execute editing and the like of the printing information sent from the selector 212 (step S906). The memory card data conversion unit 206, in accordance with the control signal sent from the proxy printing judgment unit 203, executes the process and the like to determine the arrangement and size of the images and the like included in the printing information and creates the printing information for executing the appropriate printing for this printing information.

Next, the proxy printing judgment unit 203 acquires the printing quality information associated with the selection information acquired from the RAM 209a of the operator panel control unit 209 at the aforementioned step S171 (step S907). This information is then stored in the RAM 203.

Next, the proxy printing judgment unit 203 judges whether the resolution assigned by the printing quality information acquired at the step S907 is of a lower value than the maximum value for resolution of the printer 2 and also judges whether it is possible to execute printing with the resolution assigned by the printing quality information for the printer 2 (step S907). The proxy printing judgment unit 203 accesses beforehand the RAM 209a of the operator panel control unit 209, reads the information of, for example, 600 dpi being the maximum resolution value capable of being assigned for printing by the printer 2 and executes the process to compare this information of 600 dpi to the resolution assigned by the printing quality information. In a case where the resolution assigned by this printing quality information is of a greater value than 600 dpi, it is judged that printing cannot be executed by the printer 2 with the resolution assigned by the printing quality information. Also, in a case where the resolution assigned by this printing quality information is of a lower value than 600 dpi, it is judged that printing can be executed by the printer 2 with the resolution assigned by the printing quality information.

Next, the proxy printing judgment unit 203, in a case where it is judged that printing cannot be executed by the printer 2 with the resolution assigned by the printing quality information (the "YES" of step S908), executes the process to perform proxy printing after this judgment (step S911).

Also, in a case where it is judged at the step S908 that printing can be executed by the printer 2 with the resolution assigned by the printing quality information (the "NO" of step S908), the proxy printing judgment unit 203 sends a command signal to the selector 213 and the selector 213 acquires the printing information created at the step S906 from the memory card data conversion unit 206 and executes the process to send this information to the printing data conversion unit 205 (step S909). The printing data conversion unit 205 then executes data processing for the printing information sent from the selector 213 and creates the raster data. The print engine unit 210 executes printing based on this raster data.

Next, the proxy printing judgment unit 203 judges whether printing of the file corresponding to all of the selection information stored in the RAM 209a of the operator panel control unit 209 was executed (step S910). The proxy printing judgment unit 203 accesses the RAM 209a and judges whether there are items that have not been acquired in the selection information stored in the RAM 209a at the step S901. In a case where there are still items that have not been acquired (the "YES" of step S910), the processes from the step S902 are repeated and performed again. In a case where there are no items yet to be acquired (the "NO" of step S910), the process is finished.

Figure 12:
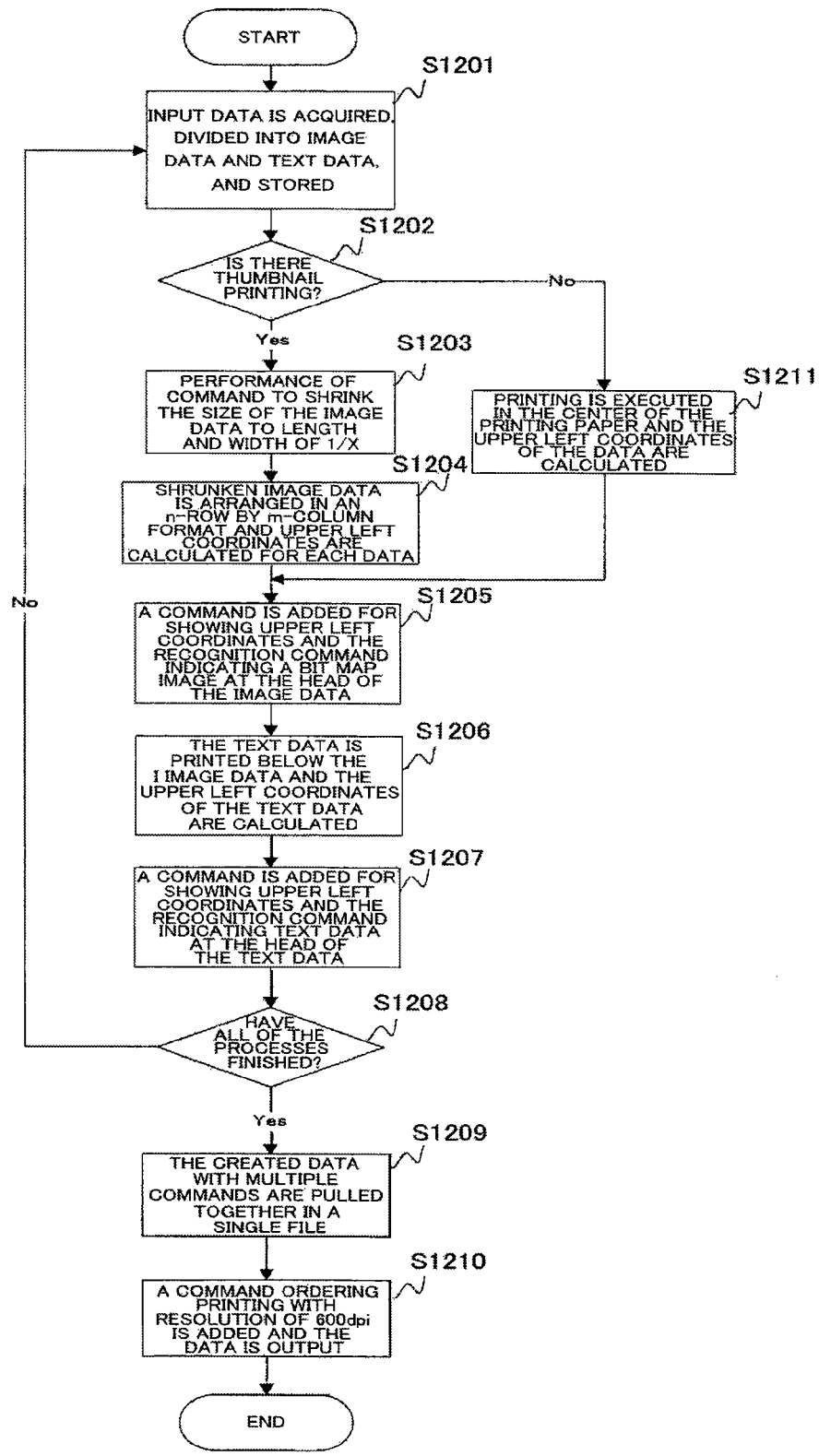
FIG. 12 is a flow chart showing the process performed by the memory card data conversion unit 206 of the printer 2 of the present invention.

Concerning the process of editing and the like for the printing information performed by the memory card data conversion unit 206 at the aforementioned steps S805 and S906, a detailed explanation is given using the flow chart shown in FIG. 12. First, the memory card data conversion unit 206 divides the printing information sent from the selector 212 into an image data portion of images and the like and a text data portion showing the size and such of the file that includes the printing information and the time and date information of the images and the like taken by a digital camera and the like, and stores this information in the RAM 206a housed in the memory card data conversion unit 206 (step S1201).

Next, the memory card data conversion unit 206 judges whether the process for editing and the like into a thumbnail printing format is ordered based on the control signal sent from the proxy printing judgment unit 203 (step S1202).

Next, in a case where the process for editing and the like into a thumbnail printing format is ordered (the "YES" of step S1202), the memory card data conversion unit 206 performs a command to set the pixel count of the image data portion of the images and the like of each piece of the printing information stored in the RAM 206*a* to 1/x (step S1203). For example, in a case where the user previously sets x to 10 and a command is set to set the pixel count at ¹⁄₁₀, the print engine unit 210 performs a command to shrink the horizontal pixel count to 80 and the vertical pixel count to 70 every time printing is performed in a situation where the vertical pixel count of the image data portion of the images and the like is 700 and the horizontal pixel count of the image data portion of the images and the like is 800.

Next, the memory card data conversion unit 206 executes the process to suitably arrange the image data portion of each of the images and the like that were shrunk by the command performed at the step S1203 (step S1204). The memory card data conversion unit 206 executes the process to suitably arrange this image data portion with a maximum resolution value of 600 dpi that allows printing to be executed by the printer 2. The memory card data conversion unit 206 selects an arrangement as shown in FIG. 6, that is, an arrangement with 4 columns and 2 rows, in order to have the images and the like of each image data portion of "file001"~"file006" that include each piece of printing information stored in the memory card 1 be printed in a manner to suitably fall into the printing area of the printing paper with a vertical and horizontal pixel count of 70 and 80 respectively. The memory card data conversion unit 206 then calculates the upper left portion coordinates of each of the images and the like in this arrangement of 4 columns and 2 rows.

Also, in a case where the process for editing and the like into a thumbnail printing format is not ordered (the "NO" of step S1202), the memory card data conversion unit 206 executes the process to suitably arrange the image data portion of the images and the like of the printing information stored in the RAM 206*a* (step S1211). A process is executed to suitably arrange these images with a maximum resolution value of 600 dpi, which allows execution of printing by the printer 2. For example, in a case where the resolution is 600 dpi, the memory card data conversion unit 206 selects an arrangement for printing the images and the like of the image data portion in the central portion of the printing range of the printing paper and calculates the upper left portion coordinates of each of the images and the like in this arrangement.

Next, the memory card data conversion unit 206 executes the process to add a command to show the location for printing and a recognition command for the printing information at the head of the image data portion (step S1205). The memory card control unit 201 receives, via the selectors 211, 214, and 212, the file that includes the printing information read from the memory card 1, references the contents of the file, and acquires the recognition command showing the identifier of the file name. A recognition command at the head of the image data portion of the printing information and a coordinate command showing the coordinates of the upper left portion calculated at the step S1204 or the step S1211, to be explained later, are then added. Here, for example, an identifier or the like of bit map file format is provided as the identifier of the file name.

Next, the memory card data conversion unit 206 executes the process to arrange the text data portion of the printing information underneath the images and the like (step S11206). The memory card data conversion unit 206 selects an arrangement to display, underneath the arrangement of images and the like chosen at the step S1211, to be explained later, or the step S1204, the text data that shows the date and time information and the size or such of the file included in the text data portion. The memory card data conversion unit 206 then calculates the upper left portion coordinates of the text data in this arrangement.

Next, the memory card data conversion unit 206 executes the process to add a command to show the location for printing and a recognition command for the printing information at the head of the text data portion (step S1207). The memory card control unit 201 receives, via the selectors 211, 214, and 212, the file that includes the printing information read from the memory card 1, references the contents of the file, and acquires the recognition command showing the identifier of the file name. A recognition command at the head of the image data portion of the printing information and a coordinate command showing the coordinates of the upper left portion calculated at the step S1206 are then added.

Next, the memory card data conversion unit 206 judges whether the process of the above steps S1201 to S1207 were executed for all of the printing information sent from the selector 212 (step S11208). In a case where printing information that has not yet received the above process exists (the "NO" of step S1208), the processes from the step S1201 are repeated and performed again for the information that has not received the above process.

Also, in a case where printing information that has not yet received the above process does not exist (the "YES" of step S1208), the memory card data conversion unit 206 executes the process to pull together and store in a single printing file for printing, the text data portion and the image data portion of the printing information that received the above process (step S1209).

The memory card data conversion unit 206 then adds a printing command to order printing for the file for printing (step S1210). A process like that described above and a process of editing and the like is executed for the printing information.

Figure 10:
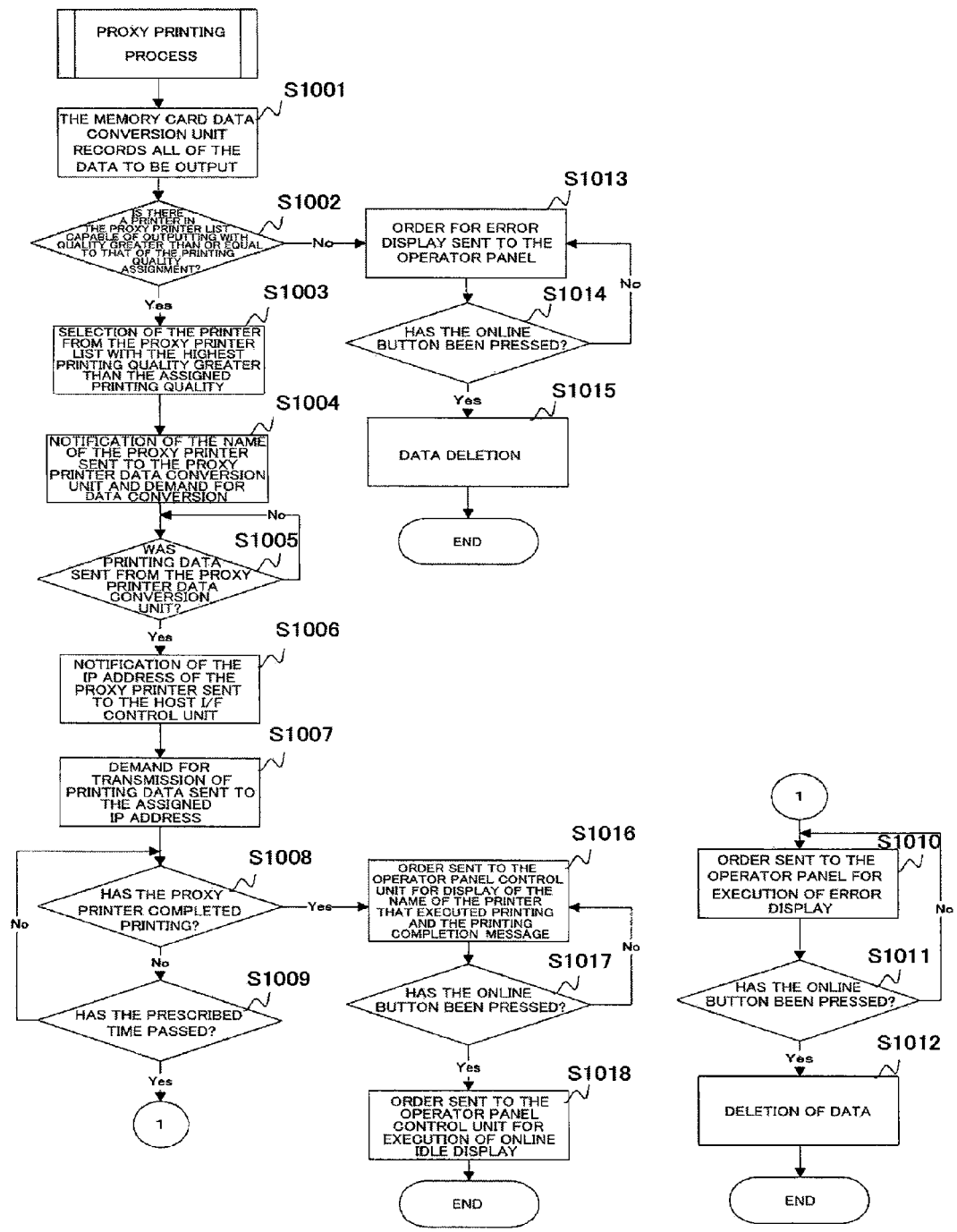
FIG. 10 is a flow chart showing the proxy printing process performed by the proxy printing judgment unit 203 of the printer 2 of the present invention.

Concerning the proxy printing process performed by the proxy printing judgment unit 203 at the aforementioned steps S810 and S911, a detailed explanation is given using the flow chart shown in FIG. 10. First, the proxy printing judgment unit 203 acquires file for printing that was added by the printing command at the aforementioned step S1210 and executes the process to store this file in the RAM 203*a* (step S1001).

Next, the proxy printing judgment unit 203 begins the process to detect a printer that is capable of executing printing with the printing quality information in the "thumbnail printing" or "file printing" stored in the RAM 209*a* acquired at the steps S807 and S907 (step S1002). First, a process is executed to compare the resolution assigned by this printing quality information to the resolution capable of being assigned for printing by another printer connected to the network 4. The proxy printing judgment unit 203 reads, from the RAM 203*a*, the proxy printer list, like that shown in FIG. 14 to be explained later, created according to the demand of information by the user through the proxy printer information acquisition process of the previously described step S714. Here, a proxy printer list is created based on the name of the printer 3, the IP address, and the maximum resolution value because the printer 3, which is a different printer than the printer 2, is connected to the network 4. The proxy printing judgment unit 203 compares each value of the maximum resolution value to the resolution assigned by the printing quality information within the proxy printer list created in this manner and judges whether a printer exists that shows a resolution value equal to or greater than that of the resolution assigned by the printing quality information.

Next, in a case where the resolution value assigned by the printing quality information is 2500 dpi or the like and the other printer that is the printer 3 is also unable to print with the assigned resolution, that is, a case where a printer showing a resolution value equal to or greater than that of the resolution assigned by the printing quality information does not exist in the printer list (the "NO" of step S1002), the proxy printing judgment unit 203 executes the error display process indicating that a printer capable of printing with the assigned resolution can not be detected (step S1013). A control signal is sent to the operator panel control unit 209 and the operator panel 208 receives the error message display information sent from the operator panel control unit 209 and executes the process to execute the error message display.

Next, the proxy printing judgment unit judges whether the user has confirmed the error message display and pressed the button 35 (step S1014). In a case where this button 35 has been pressed by the user (the "YES" of step S1014), the file for printing stored in the RAM 203a at the step S1001 is deleted (step S1015) and the process is finished. In a case where this button 35 has not been pressed by the user (the "NO" of the step S1014), the process of the step S1013 is repeated and executed again.

Also, at the step S1002, in a case where the resolution value assigned by the printing quality information is 2400 dpi, 1800 dpi, or the like, the other printer that is the printer 3 is able to print with the assigned resolution, and a printer showing a resolution value equal to or greater than that of the resolution assigned by the printing quality information exists in the printer list (the "YES" of step S1002), the proxy printing judgment unit 203 detects a printer capable of printing with the assigned resolution and executes the process to select the printer with the highest resolution from the printers in the proxy printer list with a resolution value greater than the assigned resolution (step S1003). The proxy printing judgment unit 203 selects the printer 3 from the proxy printer list as the printer showing the highest resolution and being able to print with the assigned resolution.

Next, the proxy printing judgment unit 203 executes the process to demand creation of data for proxy printing from the proxy printing data conversion unit 207 (step S1004). The proxy printing judgment unit 203 sends to the proxy printing data conversion unit 207 the file for printing stored in the RAM 203a, the information showing the name of the printer 3 selected at the step S1003, and a signal demanding creation of proxy printing data corresponding to the printer 3. A control signal is then sent to the proxy printing data conversion unit 207 and the process is executed to convert the data format of the sent printing file into a data format that allows proxy printing to be performed by the printer 3.

Next, the proxy printing judgment unit 203 judges whether the proxy printing file to be explained later was sent to the proxy printing judgment unit 203 after having the data format converted by the proxy printing data conversion unit 207 at the step S1004 (step S1005). In a case where this file has not been sent (the "NO" of step S1005), a standby state is initiated and the process to perform this same judgment is repeated and executed again.

Next, the proxy printing judgment unit 203, in a case where the converted proxy printing file has been sent (the "YES" of step S1005), sends the IP address of the printer 3 and the converted proxy printing file to the host I/F control unit 204 (step S1006). A control signals is then sent to the host I/F control unit 204 and the host I/F control unit 204 executes the process to send via the network control unit 202 and the network 4 the proxy printing file that was converted for use in the printer 3 (step S1007).

Next, the proxy printing judgment unit 203 judges whether the host I/F control unit 204 received via the network control unit 202 and the network 4 the information of the completed status of the proxy printing by the printer 3 (step S1008).

Next, in a case where the information of the completed status of the proxy printing by the printer 3 has not been received (the "NO" of step S1008), the proxy printing judgment unit 203 judges whether the prescribed time has passed since sending the converted proxy printing file to the printer 3 (step S1009) and, in a case where the prescribed time has not passed (the "NO" of step S1009), repeats and executes again the process of the step S1008.

Also, in a case where the prescribed time has passed since sending the converted proxy printing file to the printer 3 (the "YES" of step S1009), the proxy printing judgment unit 203 executes the error display process (step S1010). A control signal is sent to the operator panel control unit 209 and the operator panel 208 receives the error message display information from the operator panel control unit 209 and executes the process to execute the error message display in the display unit 30.

Next, the proxy printing judgment unit 203 judges whether the user has confirmed the error message display and pressed the button 35 (step S1011). In a case where this button 35 has been pressed by the user (the "YES" of step 1011), the proxy printing judgment unit 203 sends a control signal to the host I/F control unit 204, executes the process to delete the proxy printing file sent to the printer 3 by the network control unit 202 via the network 4 at the step S1007 (step S1012), and finishes the process. In a case where this button 35 has not been pressed by the user (the "NO" of step S1011), the process of the step S1010 is repeated and executed again.

Also, at the step S1008, in a case where the information of the completed status of proxy printing by the printer 3 is received (the "YES" of step S1008), the proxy printing judgment unit 203 executes the printing completion display process (step S1016). A control signal and the information of the name of the printer 3 are sent to the operator panel control unit 209 and the operator panel 208 receives the display information of the proxy printing completion and the information of the name of the printer 3 that executed the proxy printing from the operator panel control unit 209 and executes the process to display this information in the display unit 30.

Next, the proxy printing judgment unit 203 judges whether the user has confirmed the proxy printing completion display and pressed the button 35 (step S1017). In a case where this button 35 has been pressed by the user (the "YES" of step 1017), a control signal is sent to the operator panel control unit 209 and the operator panel 208 receives the "online idle" display information from the operator panel control unit 209, executes the process to display this information in the display unit 30 (step S1018), and finishes the process. In a case where this button 35 has not been pressed by the user (the "NO" of step 1017), the process of the step S1016 is repeated and executed again.

Figure 11:
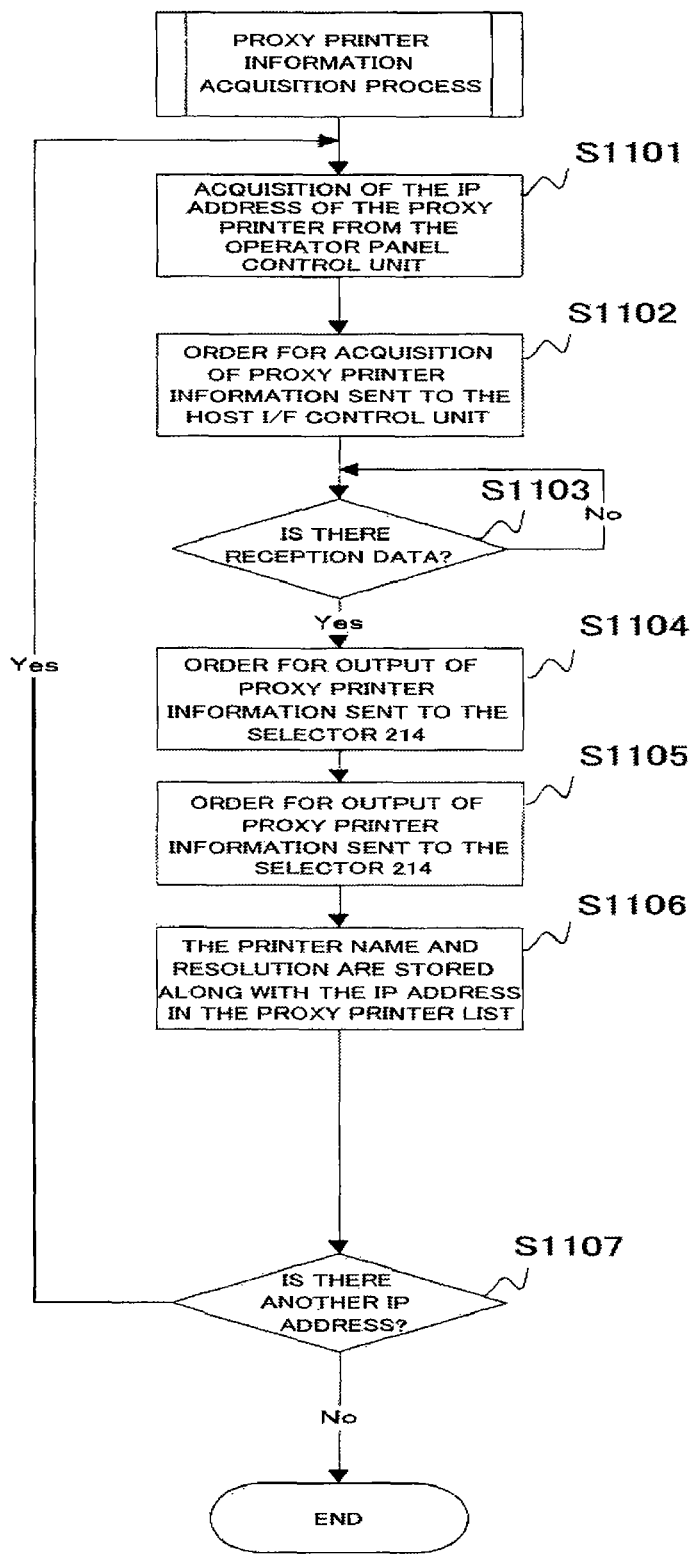
FIG. 11 is a flow chart showing the proxy printer information acquisition process performed by the proxy printing judgment unit 203 of the printer 2 of the present invention.

Concerning proxy printer information acquisition process performed by the proxy printing judgment unit 203 at the aforementioned step S714, a detailed explanation is given using the flow chart shown in FIG. 11. First, the proxy printing judgment unit 203 accesses the RAM 209a and acquires the IP address stored in the RAM 209a of the operator panel control unit 209 at the aforementioned step S703 (step S1101).

Next, the proxy printing judgment unit 203 sends this IP address and a control signal to the host I/F control unit 204 and the host I/F control unit 204 executes the process to demand the information concerning the printer 3 via the network 4 (step S1102). The host I/F control unit 204 then sends an information demand signal demanding the information concerning the printer 3 to the printer 3 via the network control unit 202 and the network 4 based on this IP address.

Next, the proxy printing judgment unit 203 judges whether the information concerning the printer 3 was received from the printer 3 that is the proxy printer (step S1103). The proxy printing judgment unit 203 also judges whether the information of the status of the information concerning the printer 3 received from the printer 3 was sent via the network 4 and the network control unit 202 from the host I/F control unit 204. In a case where this information was not sent (the "NO" of step S1103), the process of the step S1103 is repeated and performed again.

Next, in a case where the information of the status of the information concerning the printer 3 received from the printer 3 was sent from the host I/F control unit 204 (the "YES" of step S1103), the proxy printing judgment unit 203 sends a control signal to the host I/F control unit and the selector 211 acquires the information concerning the printer 3 from the network control unit 202 and executes the process to send this information to the selector 214 (step S1104).

Next, the proxy printing control unit 203 sends a control signal to the selector 214 and the selector 214 executes the process to send the information concerning the printer 3 to the proxy printing judgment unit 203 (step S1105).

Next, the proxy printing judgment unit 203 executes the process to add to the proxy printer list the information concerning the printer 3 sent from the selector 214 (step S1106). A proxy printer list for the purpose of displaying information concerning the proxy printers having items such as those shown in FIG. 14 is prepared in the RAM 209a in advance and the proxy printing judgment unit 203 adds to this printer list the IP address, maximum resolution value capable of being printed, and name of the printer 3 from the information concerning the printer 3. The proxy printer list to which this information has been added is then renewed again and stored in the RAM 203a.

Next, the proxy printing judgment unit 203 accesses the RAM 209a of the operator panel control unit 209 and judges whether there is another IP address input by the user (step S1107). In a case where there is another IP address (the "YES" of step S1107), that IP address is acquired and the processes from the step S1101 are repeated and performed again.

Also, in a case where there is not another IP address (the "NO" of step S1107), the process is finished.

Figure 13:
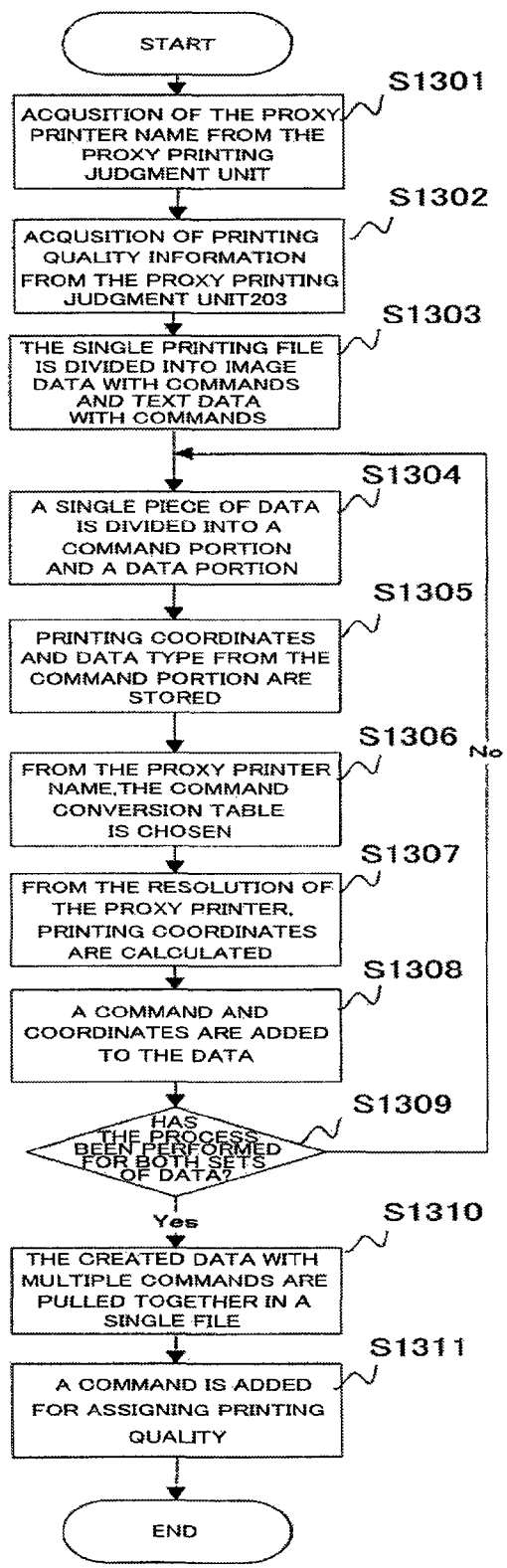
FIG. 13 is a flow chart showing the data format conversion process performed by the proxy printer data conversion unit 207 of the printer 2 of the present invention.

Concerning the creation process of the proxy printing data performed by the proxy printing data conversion unit 207 at the aforementioned step S1004, a detailed description is given using the flow chart shown in FIG. 13. First, the proxy printer data conversion unit 207 accesses the RAM 203a of the proxy printing judgment unit 203 and stores, in the RAM 207a, the name of the printer 3 as the proxy printer sent from the proxy printing judgment unit 203 at the step S1004 (step S1301).

Next, the proxy printing data conversion unit 207 executes the process to acquire the printing quality information (step S1302). The printing quality information already acquired by the proxy printing judgment unit 203 at the aforementioned step S807 or S907 is acquired and stored in the RAM 207a.

Next, the proxy printing data conversion unit 207 executes the process to divide the printing file sent from the proxy printing judgment unit 203 at the aforementioned step S1004 (step S1303). This file is divided into an image data portion to which the recognition command and coordinate command were added and a text data portion to which the recognition command and coordinate command were added.

Next, the proxy printing data conversion unit 207 executes the process to divide each data portion (step S1304). The data is divided into the recognition command and coordinate command added to the image data portion and text data portion, and an image data portion or text data portion.

Next, the proxy printing data conversion unit 207 executes the process to understand the type of data and the coordinates of the arrangement of the printing (step S1305). The data type of the data portion and the coordinates of the arrangement of the printing are understood from the identifier shown by the recognition command and the coordinates of the upper left portion in the arrangement of the data portion shown by the coordinate command and are then stored in the RAM 207a.

Next, the proxy printing data conversion unit 207 reads the name of the printer 3 as the proxy printer from the RAM 207a and executes the process to select a conversion table based on the name of the printer 3 (step S1306). The proxy printing data conversion unit 207 references the name of the printer 3, retrieves the conversion program that includes the conversion table previously stored in the RAM 207a, and detects the conversion program that includes the name of the printer 3. This is then selected as the conversion program for the purpose of the proxy printing data creation.

Next, the proxy printing data conversion unit 207 performs this conversion program and, first, executes the process to convert the coordinate command (step S1307). For example, in a case where the maximum resolution value capable of being printed by the printer 3 is 2400 dpi, with this resolution of 2400 dpi, an arrangement for the text data or images and the like of the data portion, to which the coordinate command stored in the RAM 207a was added, to be printed in such a manner that it suitably falls into the center portion or the like of the printing range of the printing paper is selected and the coordinates of the upper left portion of the text data or the arrangement of each of the images and the like is calculated.

Next, the proxy printing data conversion unit 207 executes the process to again add the recognition command stored in the RAM 207a and the converted coordinate command to the original data portion (step S1308).

Next, the proxy printing data conversion unit 207 judges whether the processes of the aforementioned steps S221~S226 were executed for both the text data portion and the image data portion (step S1309). In a case where a data portion that has not yet received the above process exists (the "NO" of step S1309), the processes for the steps S1304~S1308 are repeated and performed again for the data portion that has not yet received the above process.

Also, in a case where a data portion that has not yet received the above process does not exist (the "YES" of step S1309), the process is executed to pull together and store in a single proxy printing file, the text data portion and the image data portion to which the coordinate command and recognition command have been added at the step S1308 (step S1310).

The proxy printing data conversion unit 207 then adds a proxy printing command that assigns the resolution that was converted at the step S1307 to the proxy printing file (step S1311). Processes like those described above are executed and the process to create the proxy printer data is executed.

As described above, the proxy printing judgment unit 203 executes the process to detect a printer capable of executing printing with the printing quality information in the "thumbnail printing" or "file printing" and, in a case where it is possible for another printer to print with the assigned resolution, creates the proxy printer data. The proxy printing judgment unit 203 then sends the converted proxy printing file to the to the proxy printer via the network 4 and, because the process is executed in a manner for proxy printing to be executed by the printer 3, the suitable printer can execute printing appropriate for the assigned printing quality.

Also, the proxy printing judgment unit 203 judges whether the printer 2 is able to execute printing with the resolution assigned by the printing quality information and, in a case where it is judged that the printer 2 is not able to execute printing with the resolution assigned by the printing quality information, skips the gratuitous process for detecting another printer in a case where the printer that acquired the printing information from the storage medium is capable of printing with the assigned printing quality, because the process to perform the proxy printing is executed after this. Therefore, it is possible for printing to be executed efficiently by the suitable printer. In the above explanation the printing information and the printing quality information were explained as being input from the memory card 1 and the operator panel 208 respectively but it is also acceptable for the printing information and the printing quality information to be sent as a pair to the assigned printer 2 from a computer connected to the network 4. In this case, the printing quality information added to the printing information is separated and sent to the proxy printing judgment unit 203 and it should be judged whether proxy printing is whether proxy printing with the aforementioned sequence is necessary.

Second Embodiment

Figure 15:
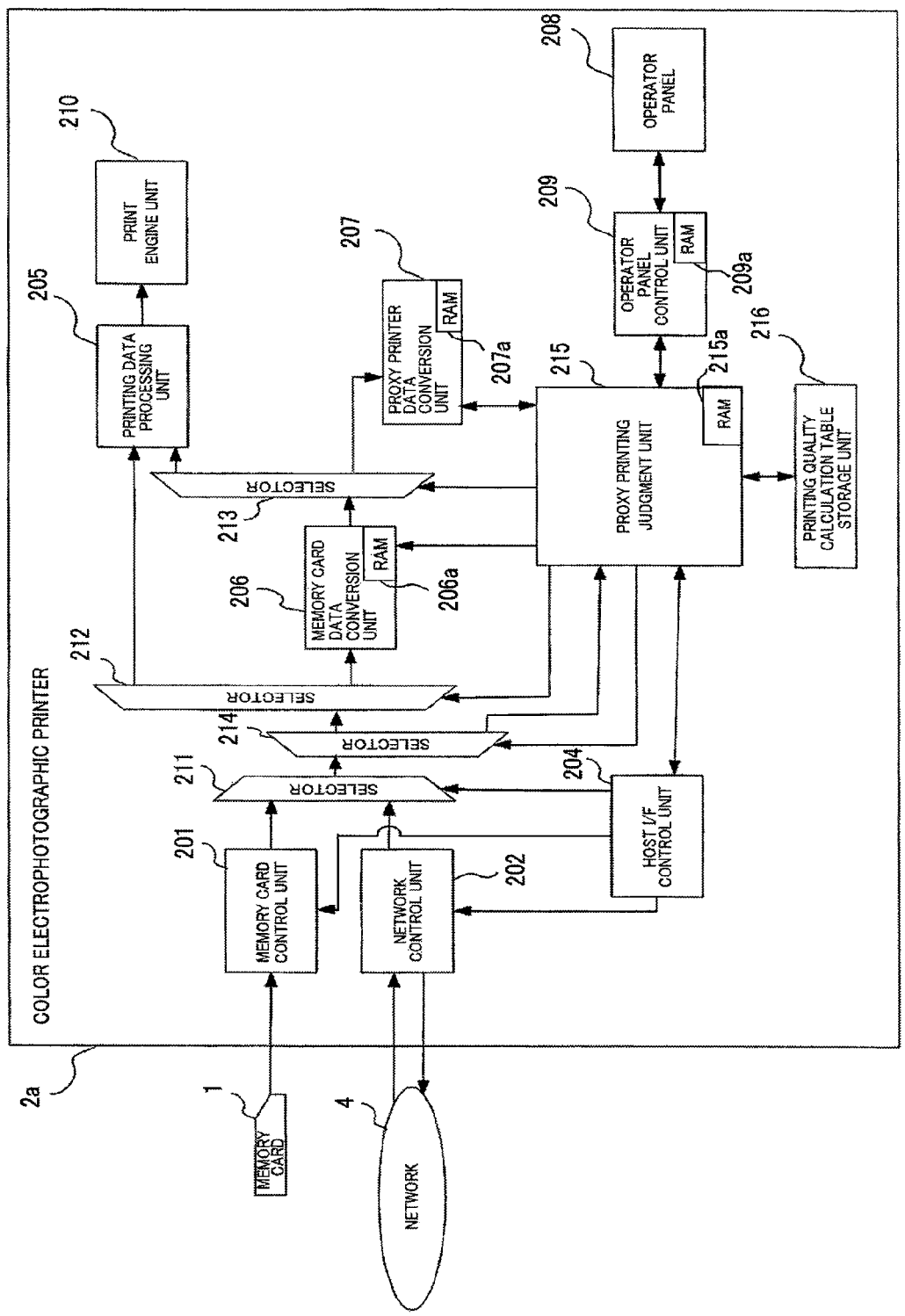
FIG. 15 is an explanatory diagram showing the construction of the printer 2 of the printing system of the second embodiment.

The following is a detailed explanation including diagrams of the best mode for carrying out the second embodiment of the present invention. FIG. 15 is an explanatory diagram showing the construction of the printer 2a of the printing system 100 of the second embodiment. The printer 2a substitutes the proxy printing judgment unit 215 for the proxy printing judgment unit 203 included in the printer 2a of the first embodiment and, aside from having a printing quality calculation table storage unit 216 connected in a manner capable of reading information from this proxy printing judgment unit 215, has entirely the same construction so an explanation will be omitted.

The proxy printing judgment unit 215 has a function to judge whether proxy printing is executed by the printer 3 based on the information stored in the RAM 209a that is housed in the operator panel control unit 209. Here, in the first embodiment, resolution information was used as the printing quality information stored in the RAM 209a but the printing quality information in the second embodiment includes the type of printing paper and resolution assigned by the user performing the assignment operation.

In the same manner as the resolution and information of the type of printing paper, the selection items displayed in the display unit 30 such as recycled paper, standard paper, and glossy paper are changed and when the button 34 is pressed performing the assignment operation while one of the types of printing paper is displayed, the operator panel control unit 209, in accordance with this assignment operation, stores the information of the type of printing paper indicated by the assignment operation in the RAM 209a. In a case where the result of the judgment executed by the proxy printing judgment unit 215 is that proxy printing is executed, there is a function to send to the host I/F control unit 204 the information for sending to the printer 3 the printing information converted by a function to be described later of the proxy printer data conversion unit 207. There is a function to control the selectors 212, 213, and 214 and process the information. Also, the proxy printing judgment unit 215 houses the RAM 215a that is for storing the printing information.

The printing quality calculation table storage unit 216 is a storage mechanism for storing, for example, the information of the ROM and such in a manner that prevents rewriting and stores a printing quality calculation table like that shown in FIG. 19. This printing quality calculation table records the points allocated for each type of printing paper and the points allocated for each value of resolution assigned by the user for every printing. In accordance with an increase in the resolution value or an improvement in the quality of the type of printing paper, higher points are allocated. In addition, the construction of the memory card 1, printer 3, and network 4 is the same as that of the first embodiment and therefore an explanation will be omitted.

Figure 16:
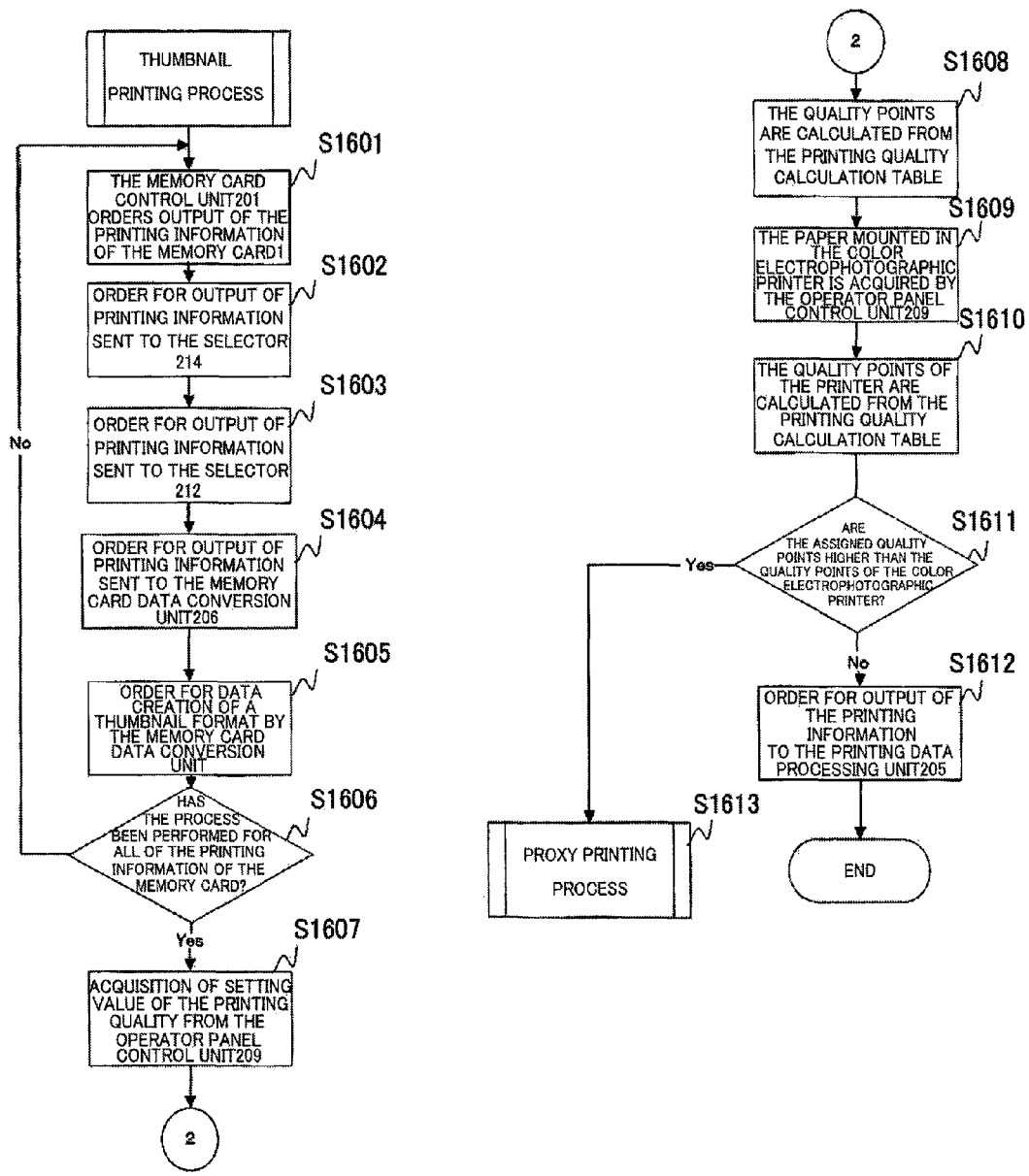
FIG. 16 is a flow chart showing the thumbnail printing process performed by the proxy printing judgment unit 203 of the printer 2a of the second embodiment.

Concerning the performance of the printing system 100 of the second embodiment, a detailed explanation is giving using diagrams. The printing system 100 of the second embodiment is the same as the printing system 100 of the first embodiment. The performance of the thumbnail printing performed at the step S712 and the proxy printer information acquisition process performed at the step S714 are different and therefore an explanation is given concerning these performances. First, concerning the thumbnail printing process performed by the proxy printing judgment unit 215, a detailed explanation is given using the flow chart shown in FIG. 16. First, the proxy printing judgment unit 215 sends a control signal to the host I/F control unit 204 and the memory card control unit 201 executes the process to send the printing information that includes all of the files stored in the memory card 1 to the selector 211 (step S1601).

Next, the proxy printing judgment unit 215 sends a control signal to the host I/F control unit 204 and the selector 211 executes the process to send all of this printing information to the selector 214 (step S1602).

Next, the proxy printing judgment unit 215 sends a control signal to the selector 214 and the selector 214 executes the process to send all of this printing information to the selector 212 (step S1603).

Next, the proxy printing judgment unit 215 sends a control signal to the selector 212 and the selector 212 executes the process to send all of this printing information to the memory card data conversion unit 206 (step S1604).

Next, the proxy printing judgment unit 215 sends a control signal to the memory card data conversion unit 206 and the memory card data conversion unit 206 performs the process to execute the creation of the printing information that is all of the printing information sent from the selector 212 edited or such into a thumbnail printing format (step S1605). The memory card data conversion unit 206, in accordance with the control signal sent from the proxy printing judgment unit 215, performs the process and the like to shrink all of the images and the like included in the printing information and the process to arrange in the prescribed location all of this printing information and creates the printing information in a thumbnail printing format.

Next, the proxy printing unit 215 executes the process to judge whether editing or such into a thumbnail printing format has been executed for all of the printing information stored in the memory card 1 (step S1606). The proxy printing judgment unit 215 judges whether all of the printing information of the thumbnail printing format created by the memory card data conversion unit 206 is consistent with all of the printing information stored in the memory card 1. Here, concerning all of the printing information stored in the memory card 1, a control signal is sent to the host I/F control unit 204 and the memory card control unit 201 executes the process to understand this information. In a case where the information is consistent, it is judged that editing or such into a thumbnail printing format has been executed for all of the printing information stored in the memory card 1. In a case where the information is not consistent, it is judged that editing or such into a thumbnail printing format has not been executed for all of the printing information stored in the memory card 1 and the processes from the step S1601 are repeated and performed again.

Next, the proxy printing judgment unit 215, in a case where it is judged that editing or such into a thumbnail printing format has been executed for all of the printing information stored in the memory card 1 (the "YES" of step S1606), executes the process to acquire the printing quality information assigned by the thumbnail printing (step S1607). The proxy printing judgment unit 215 accesses the RAM 209*a* housed in the operator panel control unit 209 and executes the process to read the printing quality information on which the assignment operation was performed at the tertiary menu display concerning "thumbnail printing" for every performance of the aforementioned operator panel 208.

Next, the proxy printing judgment unit 215 executes the process to compute the quality points based on printing quality information acquired at the step S1607 (step S1608). The proxy printing judgment unit 215 accesses the printing quality calculation table storage unit 216 and reads the printing quality calculation table. The proxy printing judgment unit 215 then references this printing quality calculation table, understands the points corresponding to the type of printing paper and resolution assigned by the printing quality information that was read at the step S1607, adds up these points, and computes the quality points. The quality points are the value of the points allocated for the type of printing paper and resolution added up after referencing the table displaying the points that display the criteria of the quality previously allocated to the type of printing paper and resolution. For example, in a case where glossy paper is assigned as the printing paper and 2400dpi is assigned as the resolution for the printing quality information by the assignment operation of the user, the points become 2 and 4 respectively and the quality points become 6.

Next, the proxy printing judgment unit 215 accesses the RAM 209*a* of the operator panel control unit 209 and executes the process to read the information of the type of printing paper used for this printing and the information of, for example, 600 dpi as the maximum resolution value capable of being assigned for printing by the printer 2 (step S1609).

Next, the proxy printing judgment unit 215 executes the process to compute the quality points of the printer 2 (step S1610). The proxy printing judgment unit 215 references the printing quality calculation table and from the 600 dpi resolution and type of printing paper understands the points corresponding to these types of printing paper and resolutions. The proxy printing judgment unit 215 then adds up these points and computes the quality points. For example, in a case where the resolution is 600 dpi and the type of printing paper is recycled paper, the points become 1 and 0 respectively and the quality points become 1.

Next, the proxy printing judgment unit 215 whether the quality points computed from the printing quality information acquired at the step S1607 are higher than the quality points of the printer 2, that is, the proxy printing judgment unit 215 judges whether it is possible for the printer 2 to execute printing that corresponds to the quality points computed from the printing quality information (step S1611). The proxy printing judgment unit 215 executes the process to compare the quality points of the printer 2 to the quality points assigned by the user computed at the steps S1610 and S1608. In a case where the quality points assigned by the user are higher than the quality points of the printer 2, it is judged that it is not possible for the printer 2 to execute printing that corresponds to the assigned quality points. Also, in a case where the quality points assigned by the user are lower than the quality points of the printer 2, it is judged that it is possible for the printer 2 to execute printing that corresponds to the assigned quality points.

Next, in a case where it is judged that it is not possible for the printer 2 to execute printing that corresponds to the assigned quality points (the "YES" of step S1611), the proxy printing judgment unit 215 then executes the process to perform proxy printing (step S1613).

Also, in a case where it is judged at the step S1611 that it is possible for the printer 2 to execute printing that corresponds to the assigned quality points (the "NO" of step S1611), the proxy printing judgment unit 215 sends a control signal to the selector 213 and the selector 213 acquires the printing information of the thumbnail printing format from the memory card data conversion unit 206 and executes the process to send this information to the printing data processing unit 205 (step S1612). The printing data processing unit 205 then executes data processing for the printing information sent from the selector 213 and creates the raster data. The print engine unit 210 executes printing of the thumbnail format based on this raster data.

Figure 17:
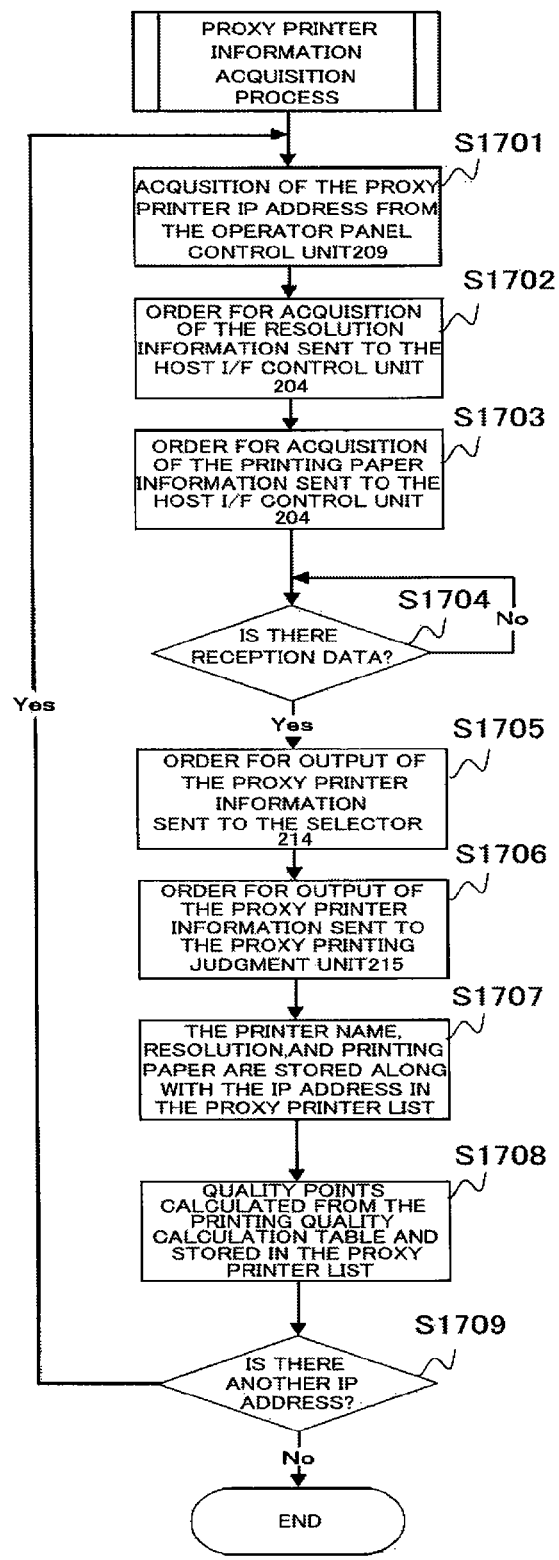
FIG. 17 is a flow chart showing the proxy printer information acquisition process performed by the proxy printing judgment unit 203 of the printer 2a of the second embodiment.

Concerning the proxy printer information acquisition process performed by the proxy printing judgment unit 215 at the aforementioned step S714, a detailed example is given using the flow chart shown in FIG. 17. First, the proxy printing judgment unit 215 accesses the RAM 209*a* at the aforementioned step S703 and acquires the IP address stored in the RAM 209*a* of the operator panel control unit 209 (step S1701).

Next, the proxy printing judgment unit 215 sends this IP address and a control signal to the host I/F control unit 204 and the host I/F control unit 204 executes the process to demand the information concerning the printer 3 via the network 4 (step S1702). The host I/F control unit 204 sends to the printer 3, via the network control unit 202 and the network 4, an information demand signal that demands the information concerning the printer 3 based on this IP address. Here, an information demand signal demanding information of the maximum resolution value capable of printing by the printer 3 is sent as the information concerning the printer 3.

Next, the proxy printing judgment unit 215 sends this IP address and a control signal to the host I/F control unit 204 and the host I/F control unit 204 executes the process to demand the information concerning the printer 3 via the network 4 (step S11703). The host I/F control unit 204 sends to the printer 3, via the network control unit 202 and the network 4, an information demand signal that demands the information concerning the printer 3 based on this IP address. Here, an information demand signal demanding information of the type of printing paper used for printing by the printer 3 is sent as the information concerning the printer 3.

Next, the proxy printing judgment unit 215 judges whether the information concerning the printer 3 was received from the printer 3 that is the proxy printer (step S1704). It is judged whether the information of the reception of the information concerning the printer 3 from the printer 3 was sent from the host I/F control unit 204 via the network 4 and the network control unit 202. In a case where this information was not sent (the "NO" of step S1704), the process of the step S1704 is repeated and performed again.

Next, in a case where the information of the reception of the information concerning the printer 3 from the printer 3 was sent from the host I/F control unit 204 (the "YES" of step S11704), the proxy printing judgment unit 215 sends a control signal to the host I/F control unit 204 and the selector 211 acquires the information concerning the printer 3 from the network control unit 202 and executes the process to send this information to the selector 214 (step S1705).

Next, the proxy printing judgment unit 215 sends a control signal to the selector 214 and the selector 214 executes the process to send the information concerning the printer 3 to the proxy printing judgment unit 215 (step S1706).

Next, the proxy printing judgment unit 215 executes the process to add to the proxy printer list the information concerning the printer 3 sent from the selector 214 (step S1707). A proxy printer list for the purpose of displaying information concerning the proxy printers having items such as those shown in FIG. 18 is prepared in the RAM 215a in advance and the proxy printing judgment unit 215 adds to this printer list the IP address, maximum resolution value capable of being printed, information of the type of printing paper, and name of the printer 3 from the information concerning the printer 3. The proxy printer list that has been added to is then renewed again and stored in the RAM 215a.

Next, the proxy printing judgment unit 215 computes the quality points and executes the process to add to these points to the proxy printer list (step S1708). The proxy printing judgment unit 215 accesses the printing quality calculation table storage unit 216, reads the printing quality calculation table, references this table, and understands the points from the type of printing paper and maximum resolution value of the printer 3 of the proxy printer list stored at the step S1707. The proxy printing judgment unit 215 then adds up these points and computes the quality points. For example, in a case where the type of printing paper is glossy paper and the resolution is 2400 dpi, the points become 2 and 4 respectively and the quality points become 6. Further, the process is executed to add these computed quality points to the proxy printer list and the proxy printer list to which these points have been added is then renewed again and stored in the RAM 215a.

Next, the proxy printing judgment unit 215 accesses the RAM 209a of the operator panel control unit 209 and judges whether another IP address has been input by the user (step S1709). In a case where there is another IP address (the "YES" of step S1709), that IP address is acquired and the processes from the step S1701 are repeated and performed again.

Also, in a case where there is not another IP address (the "NO" of step S1709), the process is finished.

In the manner described above, the proxy printing judgment unit 215 judges whether the printer 2a can execute printing corresponding to the quality points based on the type of printing paper and resolution assigned by the printing quality information. In a case where it is judged that the printer 2a cannot execute the printing, the proxy printing judgment unit 215 skips the gratuitous process for detecting another printer in a case where the printer that acquired the printing information from the storage medium is capable of printing with the assigned printing quality, because the process to perform the proxy printing is executed after this. Therefore, it is possible for printing to be executed efficiently by the suitable printer.

In the same manner as the first embodiment, the proxy printing judgment unit 215 executes the process to detect a printer that is capable of executing printing with the printing quality information in the "thumbnail printing" and detects a printer capable of executing printing corresponding to the quality points based on the type of printing paper and resolution assigned as the printing quality information. The proxy printer data is created and, because the process is executed for the printer 3 to execute proxy printing, it is possible for the printing corresponding to the assigned printing quality to be executed by the suitable printer.

In addition, the process to compare the resolution assigned by the printing quality information to each maximum resolution value in the proxy printer list performed by the proxy printing judgment unit 203 at the step S1002 of the proxy printing process of the first embodiment is replaced in the second embodiment with the process to compare the quality points assigned by the printing quality information to the quality points in the proxy printer list. In the second embodiment, a performance was executed for the purpose of executing the printing and computation of quality points assigned by the printing quality information in the thumbnail printing process and, in the same manner, the file printing process executes the same process to compute the quality points assigned by the printing quality information at the steps S907 and S908.

Third Embodiment

Figure 20:
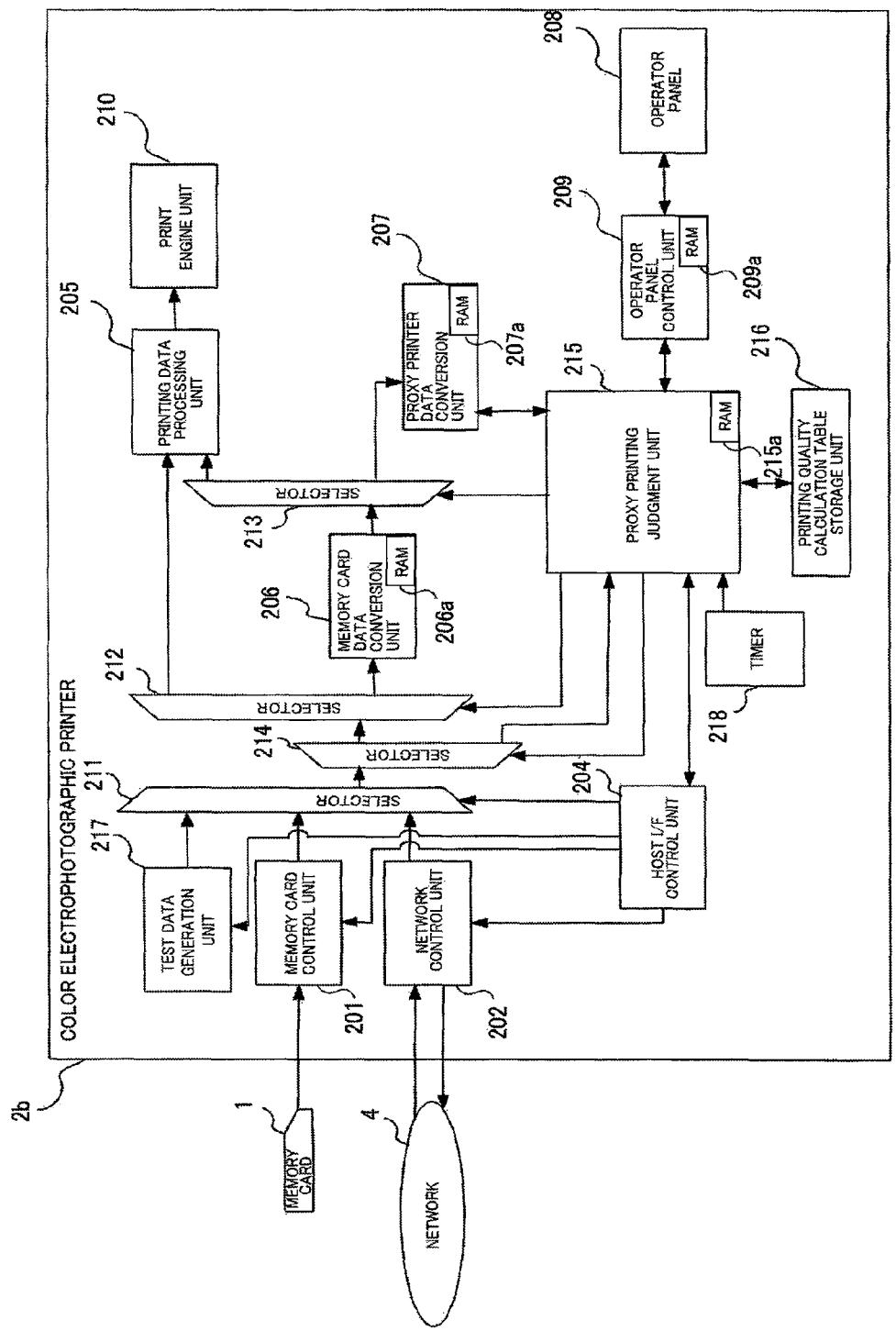
FIG. 20 is an explanatory diagram showing the construction of the printer 2b of the printing system of the third embodiment.

The following is a detailed explanation including diagrams of the best mode for carrying out the third embodiment of the present invention. FIG. 20 is an explanatory diagram showing the construction of the printer 2b of the printing system 100 of the third embodiment. The printer 2b is the printer 2a of the second embodiment further having a timer 218 connected to the proxy printing judgment unit 215 and a test data generation unit 217 that creates test printing data for performing test printing from a printer connected to the network 4.

The test data generation unit 217 has a function to create the test printing data used every time test printing is performed for the purpose of measuring of the printer connected to the network 4 and to send this data to the selector 211. The created test printing data has its data format converted by the proxy printing data conversion unit 207 into a data format that allows the printer connected to the network 4 to perform proxy printing and is then sent to the printer via the host I/F control unit 204 and the network 4. Here in the third embodiment, the selector 211 has three input terminals and is connected to the memory card control unit 201, network control unit 202, and the test data generation unit 217.

The timer 218 has a function to measure the time from when the proxy printing judgment unit 215 sends the test printing data generated by the test data generation unit 217 to the printer connected to the network to when a signal of the completed status of the test printing by the printer is received. In addition, the construction of the memory card 1, printer 3, network 4, and the like is the same as that of the first embodiment and therefore an explanation will be omitted.

Figure 21:
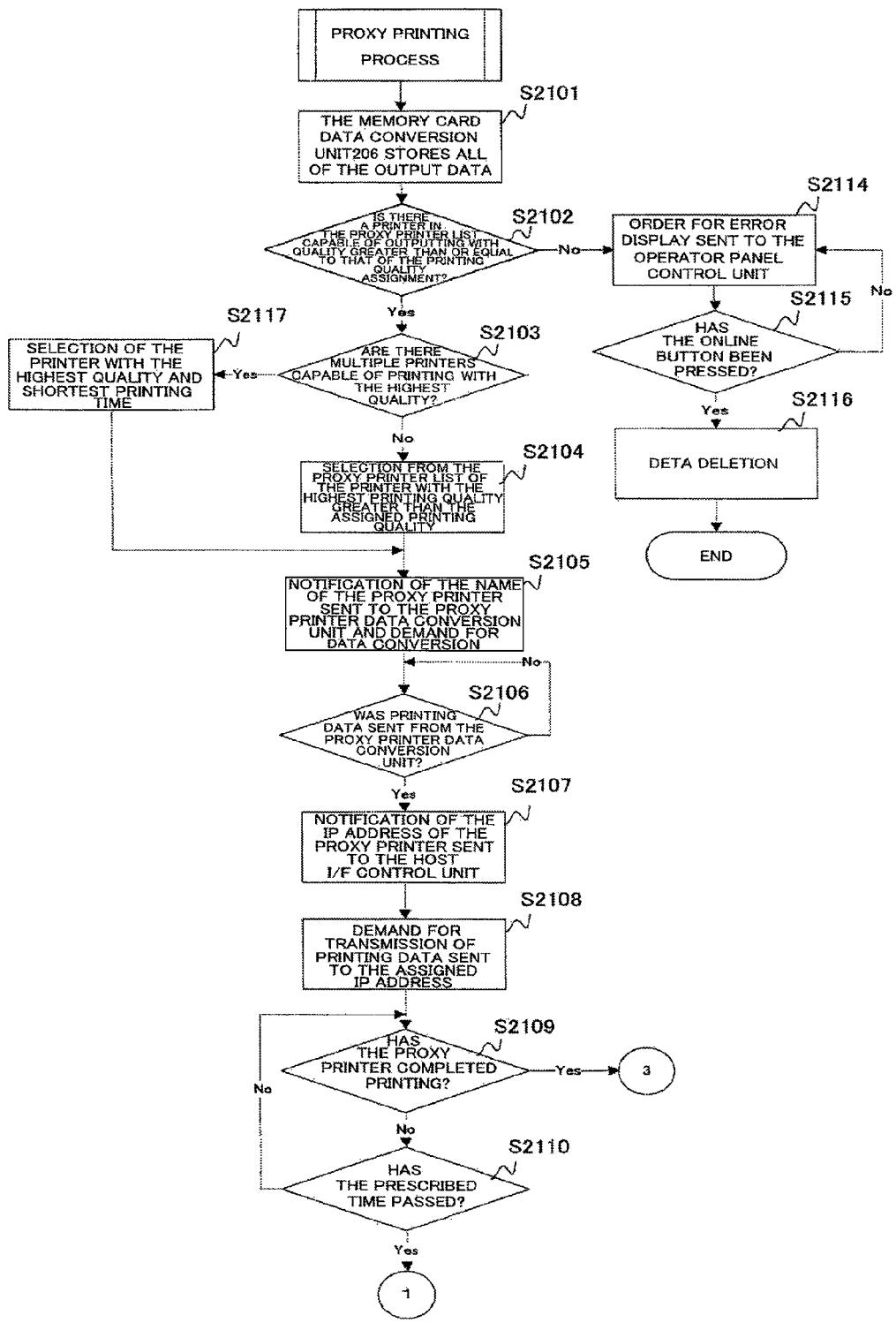
FIG. 21 is a flow chart showing the proxy printing process performed by the proxy printing judgment unit 215 of the printer 2b of the third embodiment.
Figure 22:
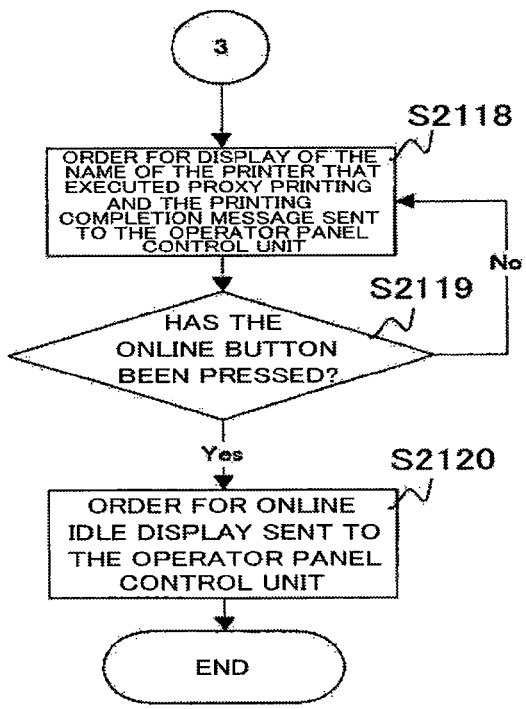
FIG. 22 is a flow chart showing the proxy printing process performed by the proxy printing judgment unit 215 of the printer 2b of the third embodiment.
Figure 22:
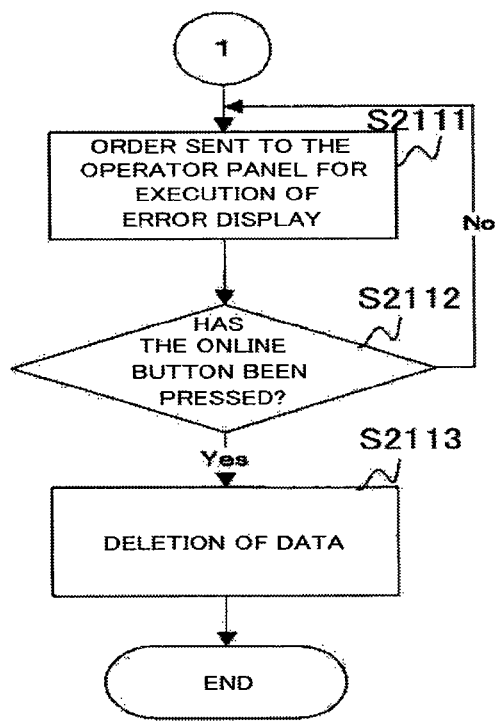

Concerning the performance of the printing system 100 of the third embodiment, a detailed explanation is giving using diagrams. The printing system 100 of the third embodiment is the same as the printing system 100 of the second embodiment. The performance of the proxy printing process performed at the file printing process or the step S1613 and the proxy printer information acquisition process performed at the step S714 are different and therefore an explanation is given concerning these performances. First, concerning the proxy printing process performed by the proxy printing judgment unit 215, a detailed explanation is given using the flow chart shown in FIG. 21 and FIG. 22. First, the proxy printing judgment unit 215 acquires, from the memory card data conversion unit 206, the printing file to which the printing command was added at the aforementioned step S1210 and executes the process to store this file in the RAM 215a (step S2101).

Next, the proxy printing judgment unit 215 begins the process to detect a printer capable of executing printing with the printing quality information of the "thumbnail printing" or "file printing" stored in the RAM 209a and acquired at the steps S807 and S907 (step S2102). First, as shown in the aforementioned second embodiment, the process is executed to compare the quality points assigned and computed by the printing quality information to the quality points of another printer connected to the network 4. The proxy printing judgment unit 215 reads, from the RAM 215a a proxy printer list as shown in FIG. 25, to be explained later, that was previously created according to the demand of information by the user in the proxy printer information acquisition process at the step S714 of the third embodiment. Here, because the printer 2b and another printer 3 are connected to the network 4, a proxy printer list is created based on the name of the printer 3, the IP address, the maximum resolution value, the type of printing paper, and the test printing time. The proxy printing judgment unit 215 references the printing quality calculation table stored in the printing quality calculation table storage unit 216, understands the points corresponding to the type of printing paper and resolution in the proxy printer list, adds up these points, and computes the quality points. Here, because the type of printing paper is glossy paper and the maximum resolution value of the printer 3 is 2400 dpi, the quality points become 6. As shown in the aforementioned second embodiment, these computed quality points are compared to the quality points earned in the same manner from the file printing process or the quality points computed at the step S11608 and it is judged whether a printer exists that shows a value equal to or higher than that of the quality points assigned by the printing quality information.

Next, in a case where the value of the quality points assigned by the printing quality information are 7 or the like and another printer that is the printer 3 cannot print with the assigned quality points, that is, a case where a printer showing a value greater than or equal to the assigned quality points does not exist in the proxy printer list (the "NO" of step 2102), the proxy printing judgment unit 215 executes the error display process indicating that a printer capable of printing with the assigned quality points can not be detected (step S2114). A control signal is sent to the operator panel control unit 209 and the operator panel 208 receives the information of the error message display from the operator panel control unit 209 and executes the process to execute the error message display.

Next, the proxy printing judgment unit 215 judges whether the user has confirmed the error message display and pressed the button 35 (step S2115). In a case where this button 35 has been pressed by the user (the "YES" of step S2115), the file for printing stored in the RAM 215a at the step S1001 is deleted (step S2116) and the process is finished. In a case where this button 35 has not been pressed by the user (the "NO" of the step S2115), the process of the step S2114 is repeated and executed again.

Also, at the step S2102, in a case where the value of the quality points assigned by the printing quality information are 5 or the like and another printer can print with the assigned quality points, that is, a case where a printer showing a value greater than or equal to the assigned quality points exists in the proxy printer list (the "YES" of step 2102), the proxy printing judgment unit 215 judges whether multiple printers with the highest quality points were detected amongst the printers capable of printing with the assigned quality points. For example, in a case where a printer with 6 quality points other than the printer 3 exists in the proxy printer list causing multiple printers with 6 quality points to exist, it is judged that multiple printers with the highest quality points exist.

Next, in a case where it is judged that multiple printers with the highest quality points exist (the "YES" of step S2103), the proxy printing judgment unit 215 executes the process to select a printer further based on the printing time (step S2117). The proxy printing judgment unit 215 references the proxy printer list and selects the printer with the shortest printing time from these printers with the highest quality points. For example, in a case where a printer with 6 quality points other than the printer 3 exists in the proxy printer list, the printer with the shortest printing time is selected from these two printers.

Also, in a case where it is judged that multiple printers with the highest quality points do not exist (the "NO" of step S2103), the proxy printing judgment unit 215 executes the process to select this printer with the highest quality points (step S2104). For example, in a case where a printer with 6 quality points other than the printer 3 does not exist and the printer 3 alone has the highest quality points, the printer 3 is selected.

Next, the proxy printing judgment unit 215 executes the process to demand creation of the proxy printer data from the proxy printer data conversion unit 207 (step S2105). The proxy printing judgment unit 215 sends to the proxy printer data conversion unit 207 the printing file stored in the RAM 215a, the information showing the name of the proxy printer selected at the steps S2104 or S2117, and the signal demanding creation of the proxy printer data corresponding to the proxy printer selected at the steps S2104 or S2117. A command signal is then sent to the proxy printer data conversion unit 207 and the process is executed to convert the data format of this sent printing file to a data format that allows proxy printing to be performed by the appropriate printer.

Next, the proxy printing judgment unit 215 judges whether the proxy printing file that had its data format converted by the proxy printer data conversion unit 207 at the step S2105 was sent back to the proxy printing judgment unit 215 (step S2106). In a case where this file has not been sent back (the "NO" of step S2106), a standby state is initiated and the process to perform this same judgment is repeated and executed again.

Next, in a case where the converted proxy printing file has been sent back (the "YES" of step S2106), the proxy printing judgment unit 215 sends to the host I/F control unit 204 the converted proxy printing file and the IP address of the proxy printer (step S2107). A control signal is then sent to the host I/F control unit 204 and the host I/F control unit 204 executes the process to send the proxy printing file that was converted for use in the proxy printer via the network control unit 202 and the network 4 (step S2108).

Next, the proxy printing judgment unit 215 judges whether the host I/F control unit 204 has received, via the network control unit 202 and the network 4, the information of the completed status of the proxy printing by the proxy printer (step S2109).

Next, in a case where the information of the completed status of the proxy printing by the proxy printer is not received (the "NO" of step S2109), the proxy printing judgment unit 215 judges whether the prescribed amount of time has passed since the proxy printing file was sent to the proxy printer (step S2110). In a case where the prescribed amount of time has not passed (the "NO" of step S2110), the process of the step S2109 is repeated and executed again.

Also, in a case where the prescribed amount of time has passed since the proxy printing file was sent to the proxy printer (the "YES" of step S2110), the proxy printing judgment unit 215 executes the error display process (step S2111). A control signal is sent to the operator panel control unit 209 and the operator panel 208 receives the information of the error message display from the operator panel control unit 209 and executes the process to execute the error message display in the display unit 30.

Next, the proxy printing judgment unit 215 judges whether the user has confirmed the error message display and pressed the button 35 (step S2112). In a case where this button 35 has been pressed by the user (the "YES" of step S2112), a control signal is sent to the host I/F control unit 204, the process is executed to delete the proxy printing file sent to the proxy printer at the step S2108 via the network control unit 202 and the network 4 (step S2113), and the process is finished.

Also, at the step S2109, in a case where the information of the completed status of the proxy printing by the proxy printer is received (the "YES" of step S2109), the proxy printing judgment unit 215 executes the printing completion display process (step S2118). A control signal and the information of the name of the proxy printer are sent to the operator panel control unit 209 and the operator panel 208 receives from the operator panel control unit 209 the information of the name of the proxy printer that executed the proxy printing and the information of the display of the proxy printing completion and executes the process to display this information in the display unit 30.

Next the proxy printing judgment unit 215 judges whether the user has confirmed the proxy printing completion display and pressed the button 35 (step S2119). In a case where this button 35 has been pressed by the user (the "YES" of step S2119), a control signal is sent to the operator panel control unit 209 and the operator panel 208 receives from the operator panel control unit 209 the information of the display of "online idle", executes the process to display this information in the display unit 30 (step S2120), and finishes the process. In a case where this button 35 has not been pressed by the user (the "NO" of step S2119), the process of the step S2118 is repeated and executed again.

Figure 23:
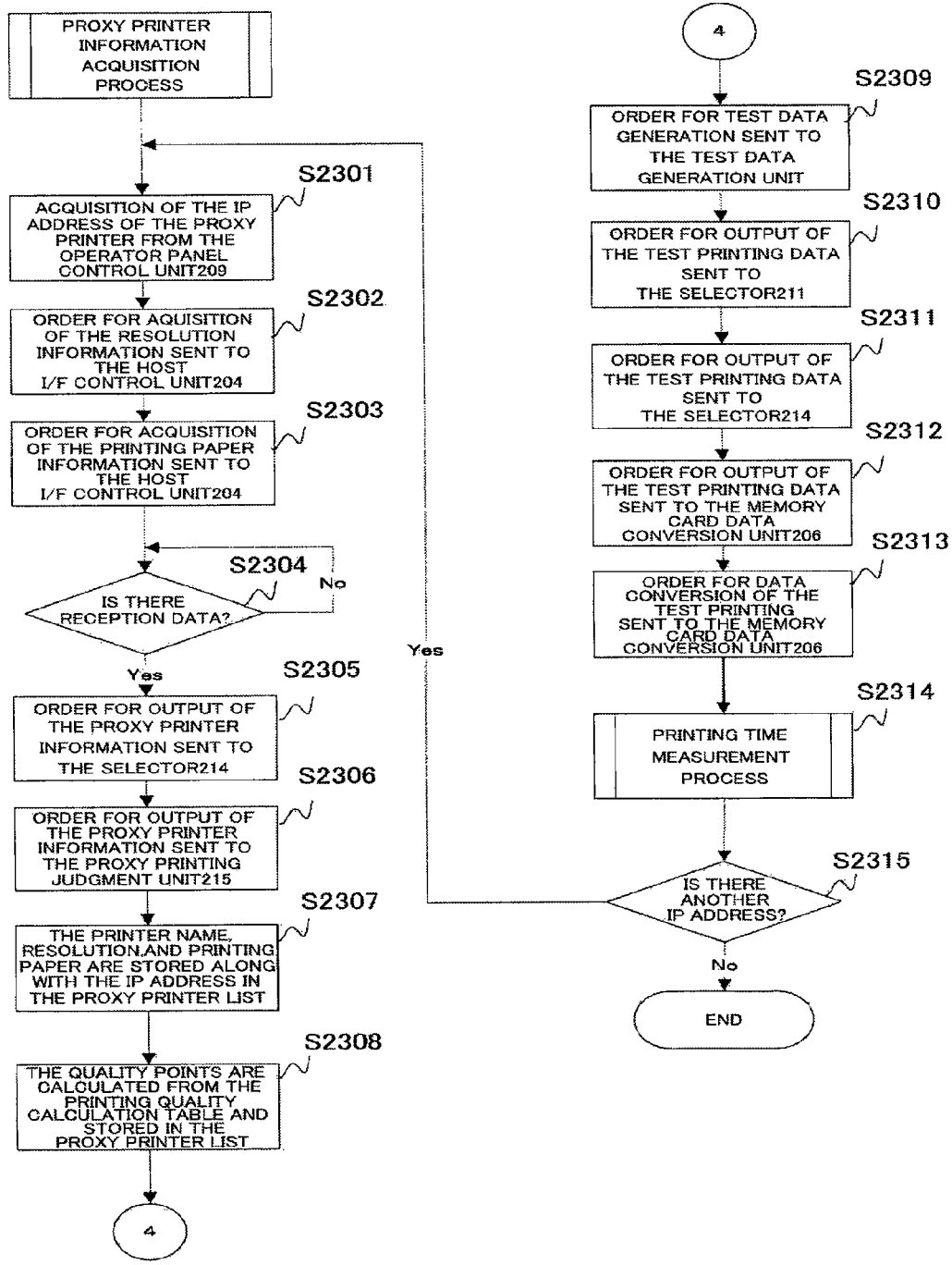
FIG. 23 is a flow chart showing the proxy printer information acquisition process performed by the proxy printing judgment unit 215 of the printer 2b of the third embodiment.

Concerning the proxy printer information acquisition process performed by the proxy printing judgment unit 215 at the aforementioned step S714, a detailed explanation is given using the flow chart shown in FIG. 23. First, the proxy printing judgment unit 215 accesses the RAM 209a and acquires the IP address stored in the RAM 209a of the operator panel control unit 209 at the aforementioned step S703 (step S2301).

Next, the proxy printing judgment unit 215 sends a control signal and this IP address to the host I/F control unit 204 and the host I/F control unit 204 executes the process to demand the information concerning the printer 3 via the network 4 (step S2302). Then, the host I/F control unit 204, based on this IP address, sends to the printer 3 an information demand signal demanding the information concerning the printer 3 via the network control unit 202 and the network 4. Here, the information demand signal is sent demanding the information of the maximum resolution value capable of being printed by the printer 3 as the information concerning the printer 3.

Next, the proxy printing judgment unit 215 sends a control signal and this IP address to the host I/F control unit 204 and the host I/F control unit 204 executes the process to demand the information concerning the printer 3 via the network 4 (step S2303). Then, the host I/F control unit 204, based on this IP address, sends to the printer 3 an information demand signal demanding the information concerning the printer 3 via the network control unit 202 and the network 4. Here, the information demand signal is sent demanding the information of the type of printing paper used in the printing by the printer 3 as the information concerning the printer 3.

Next, the proxy printing judgment unit judges whether the information concerning the printer 3 was received by the printer 3 that is the proxy printer (step S2304). The proxy printing judgment unit 215 also judges whether the information of the status of the information concerning the printer 3 received from the printer 3 was sent via the network 4 and the network control unit 202 from the host I/F control unit 204. In a case where this information was not sent (the "NO" of step S2304), the process of the step S2304 is repeated and performed again.

Next, in a case where the information of the status of the information concerning the printer 3 received from the printer 3 was sent from the host I/F control unit 204 (the "YES" of step S2304), the proxy printing judgment unit 215 sends a control signal to the host I/F control unit and the selector 211 acquires the information concerning the printer 3 from the network control unit 202 and executes the process to send this information to the selector 214 (step S2305).

Next, the proxy printing control unit 215 sends a control signal to the selector 214 and the selector 214 executes the process to send the information concerning the printer 3 to the proxy printing judgment unit 215 (step S2306).

Next, the proxy printing judgment unit 215 executes the process to add to the proxy printer list the information concerning the printer 3 sent from the selector 214 (step S2307). A proxy printer list for the purpose of displaying information concerning the proxy printers having items such as those shown in FIG. 25 is prepared in the RAM 215a in advance and the proxy printing judgment unit 215 adds to this printer list the IP address, maximum resolution value capable of being printed, information of the type of printing paper, and name of the printer 3 from the information concerning the printer 3. The proxy printer list to which this information has been added is then renewed again and stored in the RAM 215a.

Next, the proxy printing judgment unit 215 computes the quality points and executes the process to add them to the proxy printer list (step S2308). The proxy printing judgment unit 215 accesses the printing quality calculation table storage unit 216, reads the printing quality calculation table, references this table, and understands the points from the type of printing paper and maximum resolution value of the printer 3 of the proxy printer list stored at the step S2307. The proxy printing judgment unit 215 then adds up these points and computes the quality points. For example, in a case where the type of printing paper is glossy paper and the resolution is 2400 dpi, the points become 2 and 4 respectively and the quality points become 6. Further, the process is executed to add these computed quality points to the proxy printer list and the proxy printer list to which these points have been added is then renewed again and stored in the RAM 215a.

Next, the proxy printing judgment unit 215 sends a control signal to the host I/F control unit 204 and the test data generation unit 217 generates the test printing data for performing printing by the printer 3 and, further, executes the process to send this data to the selector 211 (step S2309). The information of the images and the like for use in the test printing are included in this test printing data as the test printing for the printer 3. Even in a case where multiple test printing data were created, the same information of the images and the like is included in all of these data.

Next, the proxy printing judgment unit 215 sends a control signal to the host I/F control unit 204 and the selector 211 executes the process to send this test printing data to the selector 214 (step S2310).

Next, the proxy printing judgment unit 215 sends a control signal to the selector 214 and the selector 214 executes the process to send this test printing data to the selector 212 (step S2311).

Next, the proxy printing judgment unit 215 sends a control signal to the selector 212 and the selector 212 executes the process to send this test printing data to the memory card data conversion unit 206 (step S2312).

Next, the proxy printing judgment unit 215 sends a control signal to the memory card data conversion unit 206 and the memory card data conversion unit 206 performs the process to execute editing and the like for the test printing data sent from the selector 212 (step S2313). The memory card data conversion unit 206, in accordance with the control signal sent from the proxy printing judgment unit 215, executes the process and the like to determine the arrangement and size of the images and the like included in the test printing data and creates the test printing data for executing the appropriate printing.

Next, the proxy printing judgment unit 215 uses the edited test printing data and executes the process to measure the printing time (step S2314).

Next, the proxy printing judgment unit 215 accesses the RAM 209a of the operator panel control unit 209 and judges whether there is another IP address input by the user (step S2315). In a case where there is another IP address (the "YES" of step S2315), that IP address is acquired and the processes from the step S2301 are repeated and performed again.

Also, in a case where there is not another IP address (the "NO" of step S2315), the process is finished.

Figure 24:
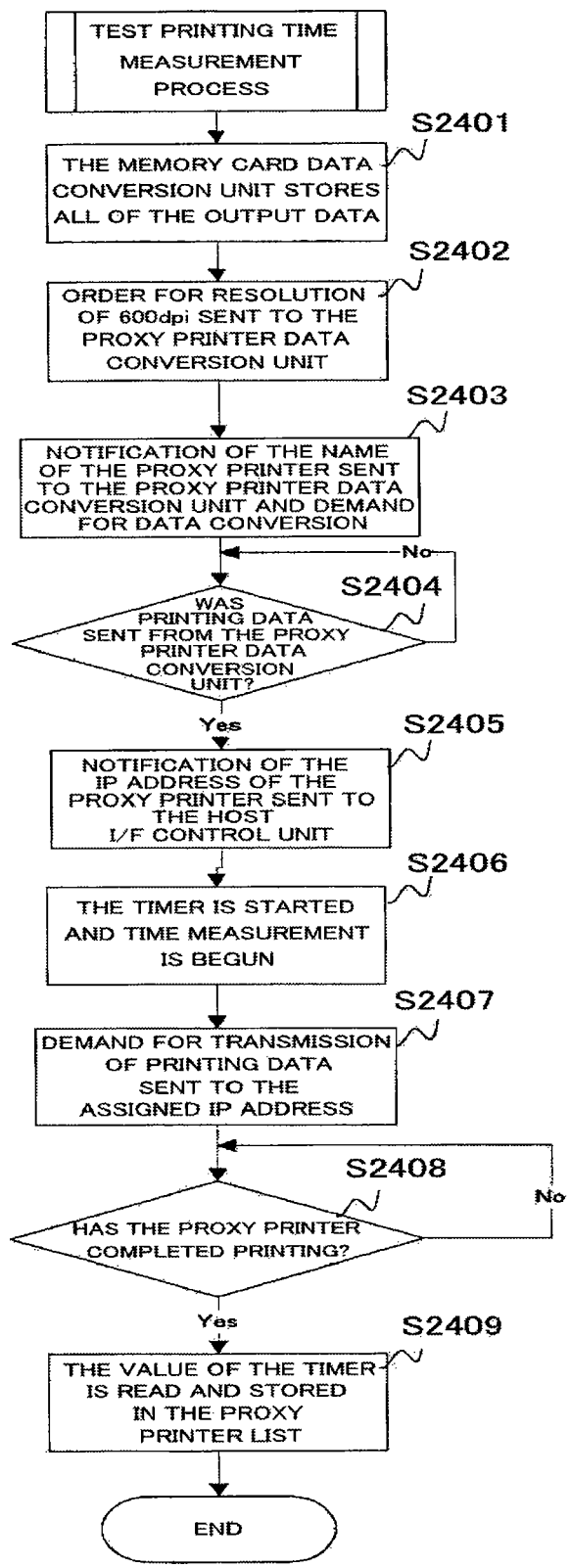
FIG. 24 is a flow chart showing the test printing time measurement process performed by the proxy printing judgment unit 215 of the printer 2b of the third embodiment.

Concerning the printing time measuring process performed by the proxy printing judgment unit 215 at the aforementioned step S2314, a detailed explanation is given using the flow chart shown in FIG. 24. First, the proxy printing judgment unit 215 acquires the test printing data on which the process of editing and the like was performed by the memory card data conversion unit 206 at the aforementioned step S2313 and executes the process to store this data in the RAM 215a (step S2401).

Next, the proxy printing judgment unit 215 executes the process to send to the proxy printer data conversion unit 207 a signal demanding creation of proxy printer data with resolution that allows the printing of the test printing data stored in the RAM 215a by a printer connected to the network 4 (step S2402). Here, for example, a signal is sent demanding creation of proxy printer data with, for example, 600 dpi as the resolution capable of being printed by the printer 2b and the printer 3.

Next, the proxy printing judgment unit 215 executes the process to demand creation of the proxy printer data concerning the test printing data stored in the RAM 215a (step S2403). The proxy printing judgment unit 215 sends to the proxy printer data conversion unit 207 the information showing the name of the printer 3, the test printing data stored in the RAM 215a, and a signal demanding creation of proxy printer data corresponding to the printer 3. A control signal is then sent to the proxy printer data conversion unit 207 and the process is executed to convert the data format of this test printing data that was sent into a data format that allows proxy printing to be performed by the printer 3.

Next, the proxy printing judgment unit 215 judges whether the test printing data that had its data format converted by the proxy printer data conversion unit 207 at the step S2403 has been sent to the proxy printing judgment unit 215 (step S2404). In a case where this data has not been sent (the "NO" of step S2404), a standby state is initiated and the process to perform this same judgment is repeated and executed again.

Next, in a case where the converted test printing data is sent (the "YES" of step S2404), the proxy printing judgment unit 215 sends to the host I/F control unit 204 the converted test printing data and the IP address of the printer 3 (step S2405).

Next, the proxy printing judgment unit 215 activates the timer 218, begins the measurement of time, and executes the process to measure the printing time of the printer 3 (step S2406). Then, at the same time as or directly after the beginning of this measurement, a control signal is sent to the host I/F control unit 204 and the host I/F control unit 204 executes the process to send, via the network control unit 202 and the network 4, the test printing data that was converted for use by the printer 3 (step S2407).

Next, the proxy printing judgment unit 215 judges whether the host I/F control unit 204 has received, via the network control unit 202 and the network 4, the information of the completed status of the proxy printing by the printer 3 (step S2408).

Next, in a case where the information of the completed status of the proxy printing by the printer 3 has not been received (the "NO" of step S2408), the proxy printing judgment unit 215 repeats and executes again the processes from the step S2408.

Also, in a case where the information of the completed status of the proxy printing by the printer 3 has been received (the "YES" of step S2408), the proxy printing judgment unit 215 stops the measurement by the timer 218 that executed the measurement at the step S2406 immediately after or at the same time as the reception of the information of the completed status and references the measured time of the timer 218 at that point in time (step S2409). This measured measurement time is then added to the location corresponding to the test printing time of the printer 3 in the proxy printer list stored in the RAM 215a. The proxy printer list to which this measurement has been added is then renewed again and stored in the RAM 215a and the process is finished.

As described above, the proxy printing judgment unit 215 judges whether a printer exists in the proxy printer list that is capable of executing printing corresponding to the quality points based on the type of printing paper and resolution assigned by the printing quality information and, in a case where multiple printers with the highest quality points exist, further executes the process to select the printer with the shortest printing time and performs proxy printing with this selected printer. For this reason, in a case where the printer that acquires the printing quality information from the storage medium cannot print with the assigned printing quality, proxy printing is executed by another printer and printing can therefore be performed by a suitable printer. Also, proxy printing is executed by the printer with the shortest printing time from amongst the multiple printers capable of executing the proxy printing, therefore allowing printing to be efficiently performed by a suitable printer.

Fourth Embodiment

Figure 26:
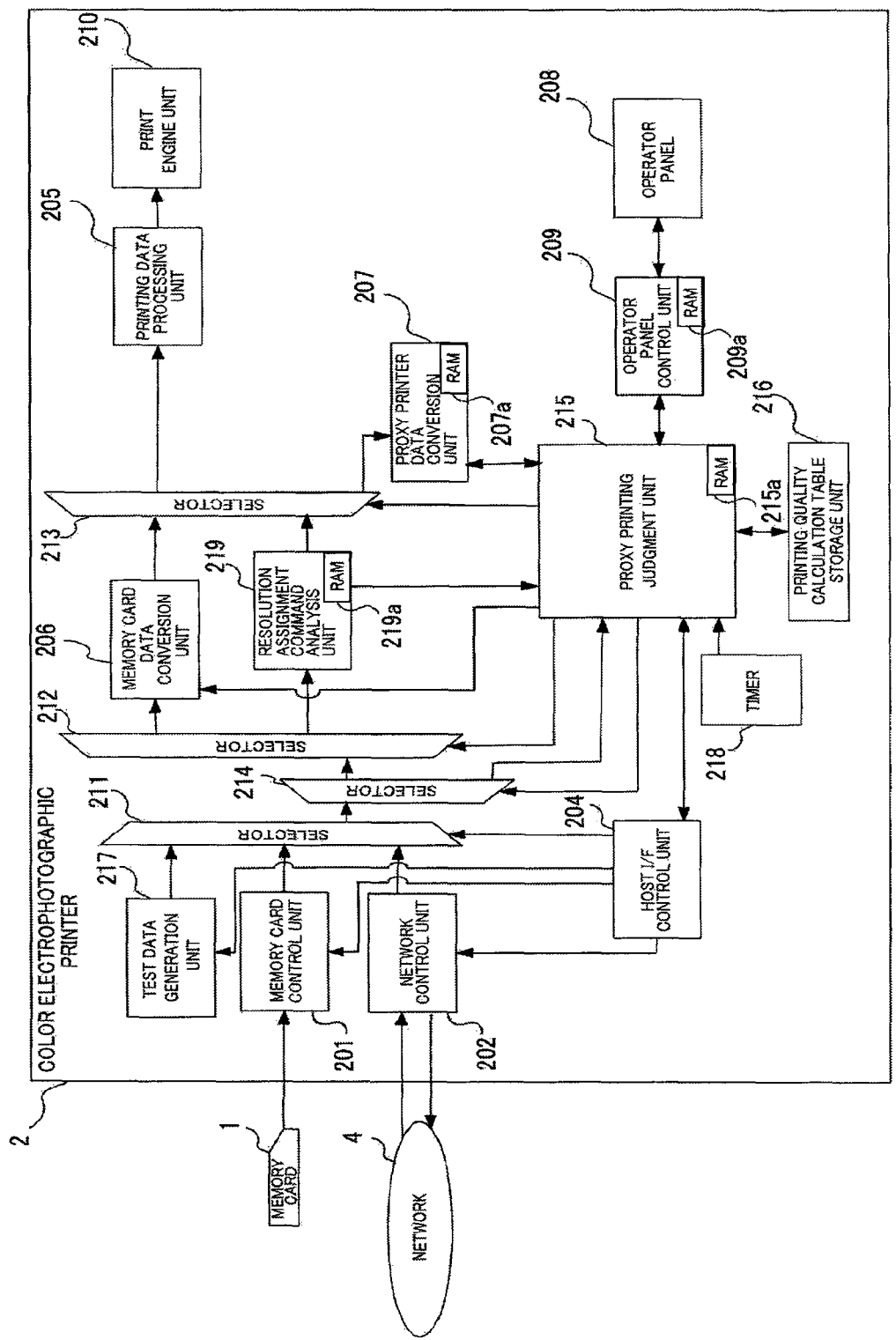
FIG. 26 is an explanatory diagram showing the construction of the printer 2c of the printing system of the fourth embodiment.

The following is a detailed explanation including diagrams of the best mode for carrying out the fourth embodiment of the present invention. FIG. 26 is an explanatory diagram showing the construction of the printer 2c of the printing system 100 of the fourth embodiment. The printer 2c is the printer 2b of the third embodiment further having a resolution assignment command analysis unit 219 that executes the process for executing printing by the printer 2c based on the information received via the network control unit 202 and the network 4.

In a case where the information demanding printing is received via the network 4 and the network control unit 202, the resolution assignment command analysis unit 219 executes the process for executing printing by the printer 2c in accordance with the resolution assignment command that assigned the resolution to which this information was added and, in a case where printing by the printer 2c is not possible, has a function to execute the process for proxy printing. Also, the information that is received is sent to the selector 216. In the fourth embodiment, the resolution assignment command is used as the printing quality information.

Here, the selector 213 of the fourth embodiment has two input terminals and is connected to the memory card data conversion unit 206 and the resolution assignment command analysis unit 219.

Figure 27:
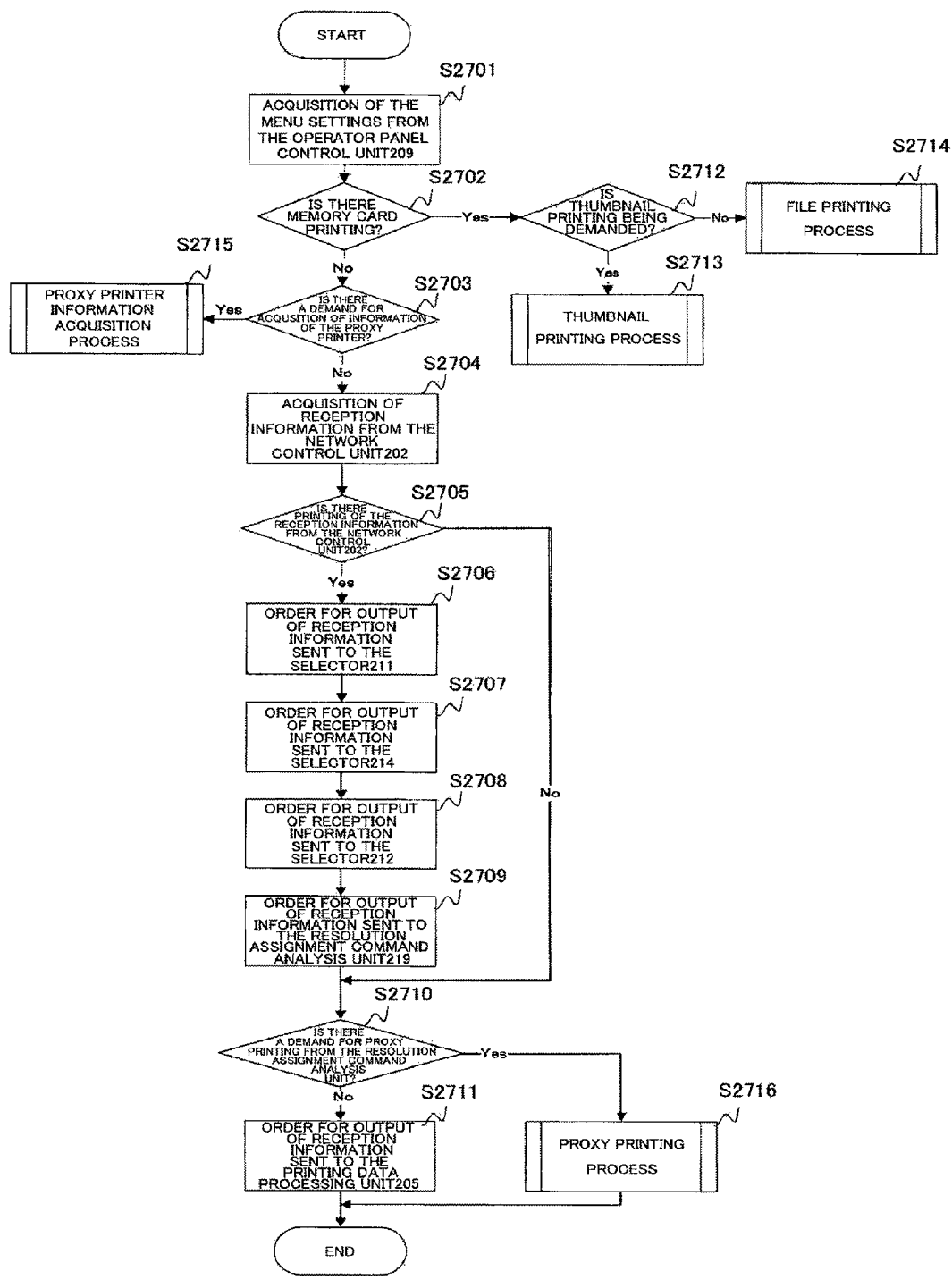
FIG. 27 is a flow chart showing the performance of the proxy printing judgment unit 215 of the printer 2c of the printing system of the fourth embodiment.

Concerning the performance of the printing system 100 of the fourth embodiment, a detailed explanation is giving using diagrams. The printing system 100 of the fourth embodiment has the same performance as that of the printing system 100 of the third embodiment. The performance of the proxy printing judgment unit 215 of thee fourth embodiment is different from the performance of the proxy printing judgment unit 203 of the first embodiment that was explained using the flow chart shown in FIG. 7 and therefore a detailed explanation concerning this performance is given using the flow chart shown in FIG. 27. The performance of this proxy printing judgment unit 215 is performed, for example, periodically every few milliseconds. First, the proxy printing judgment unit 215 begins the performance, accesses the operator panel control unit 209, and reads the selection information, printing quality information, and the like stored in the RAM 209a that is housed in the operator panel control unit 209 (step S2701).

Next, the proxy printing judgment unit 215 judges whether printing of the images and the like of the printing information stored in the memory card 1 is demanded (step S2702). In the performance of the aforementioned operator panel 208, in a case where the button 34 has been pressed by the user while "thumbnail printing" or "file printing" is displayed in the secondary menu display, the proxy printing judgment unit 215 judges that printing has been ordered and, in a case where the button 34 has not been pressed, judges that printing has not been ordered.

Next, in a case where it is judged that printing has been ordered (the "YES" of step 2702), the proxy printing judgment unit 215 judges whether this ordered printing is "thumbnail printing" (step S2712). In a case where the button 34 is pressed while "thumbnail printing" is displayed in the secondary menu display, it is judged that the ordered printing is "thumbnail printing" (the "YES" of step S2712) and the process is executed to perform "thumbnail printing" (step S2713). Also, in a case where the button 34 is pressed while "file printing" is displayed in the secondary menu display, it is judged that the ordered printing is not "thumbnail printing" (the "NO" of step S2712) and the process is executed to perform "file printing" (step S2714).

Next, in a case where it is judged that printing has not been ordered (the "NO" of step S2702), the proxy printing judgment unit 215 judges whether the user requires acquisition of the information relating to the printer 3 specified by the IP address based on, for example, the operation input by the user of the operation mechanism of a keyboard and such not shown graphically for the IP address of the network 4 of the printer 3 (step S2703). Here, as the operation mechanism for inputting the IP address, a computer and such connected to the printer 2c in a manner allowing the sending and receiving of information is provided. As the information relating to the printer 3, paper size allowing printing, printing quality allowing assignment for every printing, and range of resolution and such are provided.

Next, the proxy printing judgment unit 215, in a case where acquisition of the information relating to the printer 3 is required, performs the process for acquiring the information from the proxy printer (step S2714).

Next, the proxy printing judgment unit 215, in a case where acquisition of the information relating to the printer 3 is not required, performs the process for acquiring the information from the network control unit 202 is (step S2704). The proxy printing judgment unit 215 sends a control signal to the host I/F control unit 204 and acquires the information from the network control unit 202 via the host I/F control unit 204.

Next, the proxy printing judgment unit 215 judges whether printing is required from external equipment via the network 4 (step S2705). The proxy printing judgment unit 215 retrieves the data acquired from the network control unit 202 at step S2704 and performs the process to detect, from this information, the printing information and the order information that requires printing of the printing information. In a case where the printing information and the order information that requires printing of the printing information are detected, it is judged that printing from external equipment is required and, in a case where the printing information and the order information that requires printing of the printing information are not detected, it is judged that printing from external equipment is not required.

Next, in a case where it is judged that printing from external equipment is required (the "YES" of step S2705), the proxy printing judgment unit 215 executes the process to begin the performing this printing (step S2706). The proxy printing judgment unit 215 sends a control signal to the host I/F control unit 204 and executes the process to send the printing information and order information detected by the network control unit 202 at step S2705 to the selector 211.

Next, the proxy printing judgment unit 215 sends a control signal to the host I/F control unit 204 and executes the process to send the printing information and order information sent from the network control unit 202 by the selector 211 to the selector 214 (step S2707).

Next, the proxy printing judgment unit 215 sends a control signal to the selector 214 and the selector 214 executes the process to send the printing information and order information to the selector 212 (step S2708).

Next, the proxy printing judgment unit 215 sends a control signal to the selector 212 and the selector 212 executes the process to send the printing information and order information to the resolution assignment command analysis unit 219 (step S2709). The resolution assignment command analysis unit 219 executes the process to analyze the printing information sent from the selector 212.

Next, the proxy printing judgment unit 215 judges whether the proxy printing process is demanded based on the results of the analysis process of the resolution assignment command analysis unit 219 at the step S2709 (step S2710). In a case where the proxy printing process is demanded (the "YES" of step S2710), the proxy printing process is performed.

Next, in a case where the proxy printing process is not demanded (the "NO" of step S2710), the proxy printing judgment unit 215 sends a control signal to the selector 212 and the selector 212 executes the process to send the printing information and order information to the printing data processing unit 205 (step S2711). The printing data processing unit 205 then executes data processing for the printing information sent from the selector 212 and creates the raster data. The print engine unit 210 executes printing based on this raster data.

Also, at the step S2705, in a case where it is judged that printing from external equipment is not required (the "NO" of step S2705), the processes from the step S2710 are performed.

Figure 28:
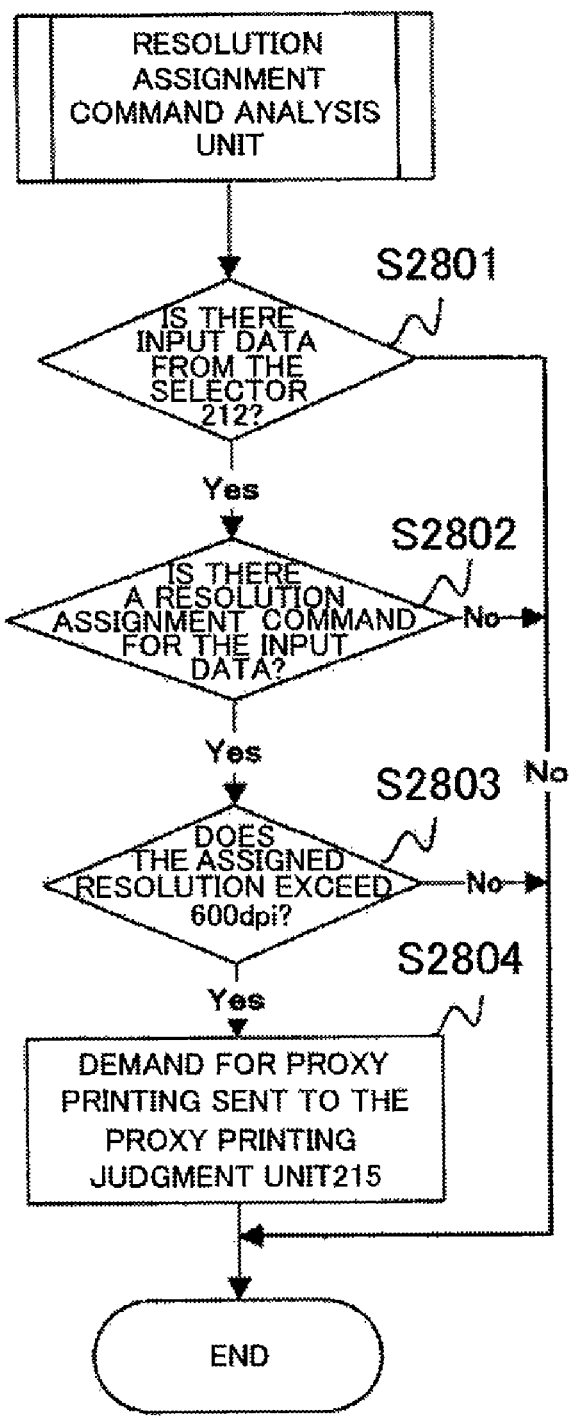
FIG. 28 is a flow chart showing the resolution assignment command analysis process performed by the resolution assignment command analysis unit 219 of the printer 2c of the fourth embodiment.

Concerning the analysis process of the printing information performed by the resolution assignment command analysis unit 219 at the aforementioned step S2709, a detailed explanation is given using the flow chart shown in FIG. 28. First, the resolution assignment command analysis unit 219 judges whether the printing information and order information were sent from the selector 212 (step S2801). In a case where it is judged that the printing information and order information were not sent from the selector 212 (the "NO" of step S2801), the process is finished.

Next, in a case where it is judged that the printing information and order information were sent from the selector 212 (the "YES" of step S2801), the resolution assignment command analysis unit 219 judges whether there is a resolution assignment command (step S2802). The resolution assignment command analysis unit 219 retrieves this printing information and executes the process to investigate whether a resolution assignment command has been added to assign the resolution for every occurrence of printing as the assignment quality information that assigns the quality of the images and the like included in the printing information.

Next, in a case where the resolution assignment command has been added to the printing information (the "YES" of step S2802), the resolution assignment command analysis unit 219 references this resolution assignment command and judges whether the resolution assigned by this resolution assignment command exceeds the maximum resolution value of the printer 2c (step S2803). The resolution assignment command analysis unit 219 judges whether the resolution assigned by the resolution assignment command exceeds the maximum resolution value of the printer 2c that is, for example, 600 dpi.

Next, in a case where the resolution assigned by the resolution assignment command exceeds 600 dpi (the "YES" of step S2803), the resolution assignment command analysis unit 219 judges that it is not possible to execute printing of the printing information with the printer 2c and sends the information demanding the proxy printing process to the proxy printing judgment unit 215 (step S2804). In addition, in the proxy printing process performed here, the printing information and order information are sent from the RAM 219a in the resolution assignment command analysis unit 219 to the proxy printing judgment unit 215. Also, in a case where the resolution assigned by the resolution assignment command does not exceed 600 dpi (the "NO" of step S2803), the process is finished.

In the above manner, in a case where printing is demanded from external equipment via the network 4, the proxy printing judgment unit 215 executes the process for the analysis of the printing information by the resolution assignment command analysis unit 219. Then, if the resolution assigned by the resolution assignment command that was added to the printing information exceeds the maximum resolution value of the printer 2c and printing by the printer 2c is not possible, the proxy printing process is executed. For this reason, for every instance where printing is demanded from external equipment via the network 4, in a case where the printer 2c that acquires the printing information from the storage medium is able to print with the assigned printing quality, the gratuitous process to detect another printer is omitted and it is therefore possible to print efficiently with a suitable printer. Also, in a case where printing is not possible by the printer 2c, proxy printing is executed by another printer and it is possible to print with a suitable printer.

Other Embodiments

In the aforementioned embodiments, at the step S901, the proxy printing judgment unit 203 acquires the selection information stored in the RAM 209a of the operator panel control unit 209 but it is also acceptable for this selection data to be previously stored in the memory card 1 and acquired via the host I/F control unit 204 and the memory card control unit 201.

In the aforementioned embodiments, at the steps S807 and S907, the proxy printing judgment unit 203 acquires the printing quality information stored in the RAM 209a of the operator panel control unit 209 but it is also acceptable for this printing quality data to be previously stored in the memory card 1 and acquired via the host I/F control unit 204 and the memory card control unit 201.

Also, the points allocated to the type of printing paper and resolution that make up the quality points are, as shown in FIG. 19, 1 and 2 points respectively for resolutions of 600 dpi and 1200 dpi and 1 point for standard paper but the allocated points are not limited to this and can be changed according to an arbitrary need. It is also acceptable to allocate points that make up the quality points not just for categories such as resolution and type of printing paper but also for the categories of the type of printer such as monochrome printing and color printing, laser printer and inkjet printer.

In the aforementioned embodiments, the memory card 1 is used as the storage medium that stores the file containing the printing information but it is not limited to this and it is also acceptable to use a floppy disk (registered trademark) and the like as the storage medium.

In addition, in the aforementioned embodiments the printer 2 that is an electrophotographic color printer and the printer 3 that is an inkjet printer are connected to the network 4 but it is also acceptable to have a monochrome printer, FAX, or copy machine connected to this network 4.

Multiple printers are connected to a network capable of sending and receiving information and it is possible for multiple printers to acquire printing information from a storage medium that stores the printing information and use a printer included in the printing system to execute printing.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A printing system comprising:
   a plurality of printers connected to a data transmission channel to be able to transmit and receive, at least one of the plurality of printers comprising:
   a storage medium detachably connected to the at least one of the plurality of printers which stores printing information and print quality information including plural items indicating output resolution and material of printing paper, each one of the items being associated with numeric quality points;
   an input unit allowing input of the printing quality information corresponding to the printing information;
   a judgment unit which determines whether the at least one printer is capable of printing the printing information based on a numeric sum of the quality points;
   an image formation unit which forms an image based on the printing information and the printing quality information when the judgment unit determines that the at least one of the plurality of printers is capable of printing the printing information; and
   a conversion unit which converts the printing information into a data format printable by another of the plurality of printers connected to the data transmission channel; and
   a transfer unit which transfers the printing information to another one of the plurality of printers capable of printing the printing information when the judgment unit determines that the at least one printer is not capable of printing the printing information.

2. The printing system according to claim 1,
   wherein the judgment unit determines whether the any one of the plurality of printers can print the printing information at a printing quality specified by the printing quality information, and
   wherein the at least one of the plurality of printers further comprises a detection unit which searches for another of the plurality of printers capable of printing the printing information at the printing quality specified by the printing quality information when the judgment unit determines that the at least one of the plurality of printers cannot print the printing information at the printing quality specified by the printing quality information.

3. The printing system according to claim 1, wherein the printing quality information includes a resolution and a type of printing medium.

4. The printing system of claim 1, wherein the data format is a thumbnail printing format.

* * * * *